United States Patent

[11] 3,576,539

| [72] | Inventors | George H. Huber<br>Cinnaminson;<br>Kenrick O. Stephenson, Jr., Upper<br>Montclair, N.J. |
|---|---|---|
| [21] | Appl. No. | 769,083 |
| [22] | Filed | Oct. 21, 1968 |
| [45] | Patented | Apr. 27, 1971 |
| [73] | Assignee | Digital Data Systems Corp.<br>Pennsauken, N.J. |

[54] COUNTER CONTROLLER CREDIT VERIFICATION SYSTEM
28 Claims, 34 Drawing Figs.

[52] U.S. Cl. .................................................. 340/152,
340/152, 340/153
[51] Int. Cl. ..................................................... H04q 5/00
[50] Field of Search .......................................... 340/149
(A), 153, 152

[56] References Cited
UNITED STATES PATENTS
3,184,714  5/1965  Brown ........................... 340/149A
3,315,230  4/1967  Weingart ........................ 340/149A
3,394,246  7/1968  Goldman ....................... 340/149A

*Primary Examiner*—Harold I. Pitts
*Attorney*—Woodcock, Washburn, Kurtz & Mackiewicz ABSTRACT: In a credit verification system a number of counter units at remote locations are connected to a central processor over two-wire lines. The central processor has a memory containing charge account numbers which are not to be honored. The counter units each have circuitry for encoding the charge account numbers serially-by-bit. The serial-by-bit codes are transmitted through distributor units to the central processor. The counter units have circuitry for embossing the sales slip only if a valid signal is received from the central processor. An authorizer unit, also connected to one of the distributors, is provided at the credit manager's desk. By use of the authorizer unit, charge account numbers can be entered into or deleted from the memory in the central processor and an inquiry can be made as to whether a number is in memory and the reason for its presence in memory.

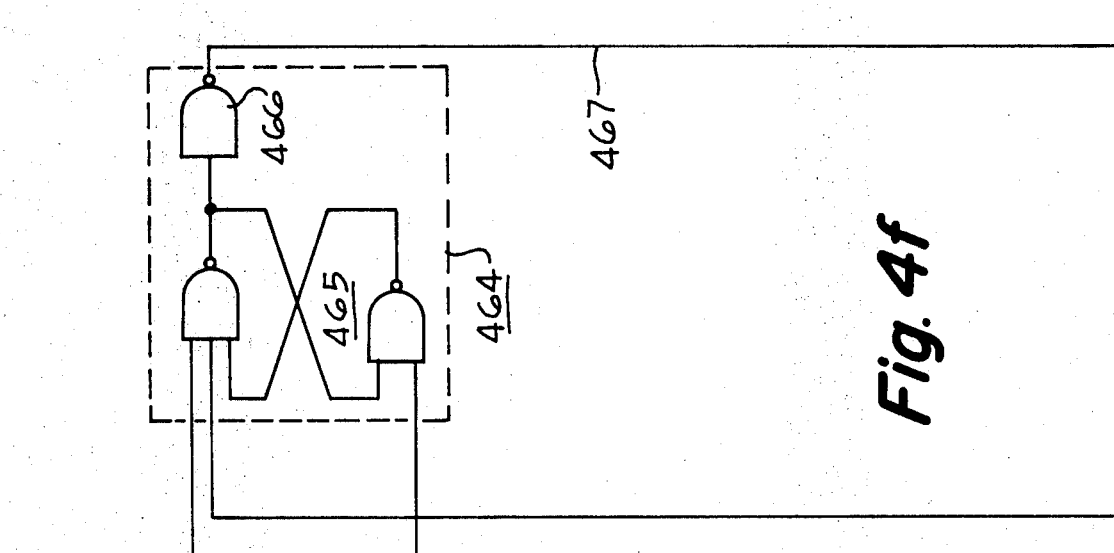
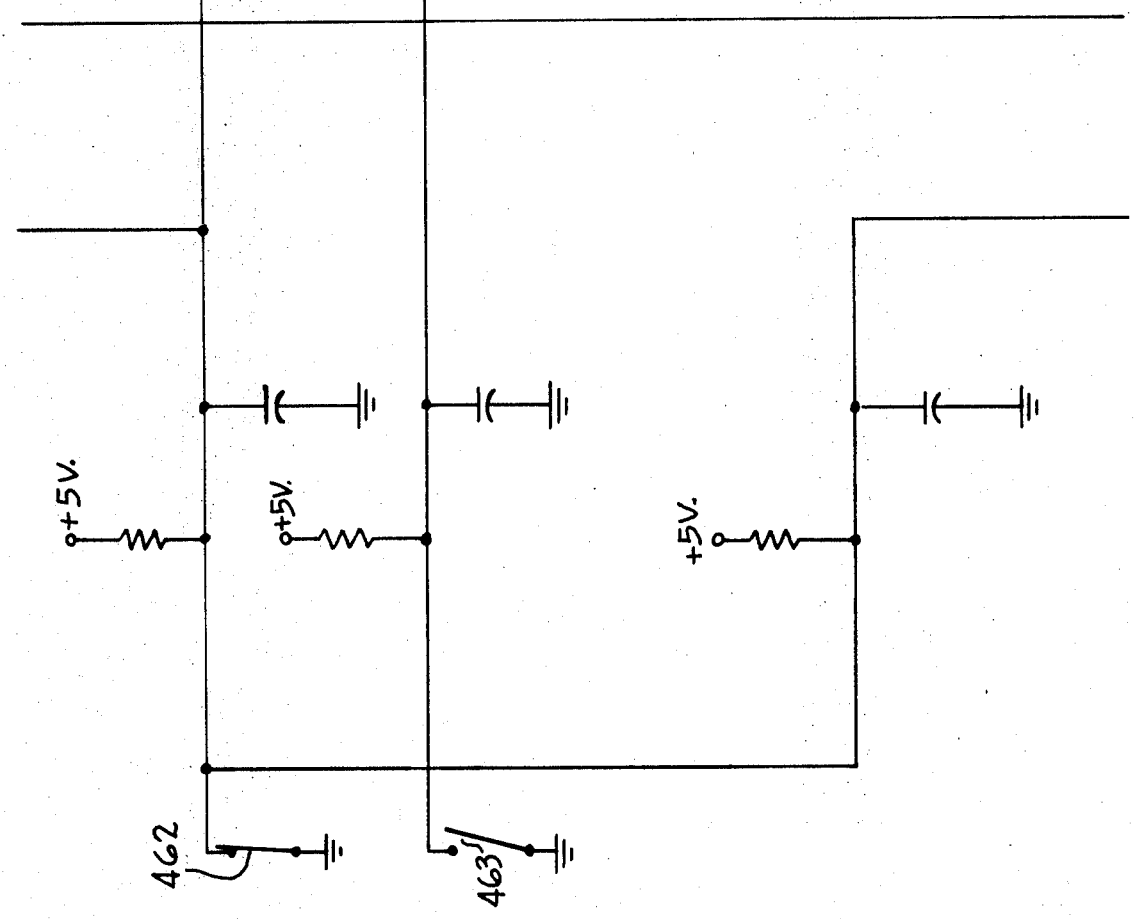
Fig. 4f

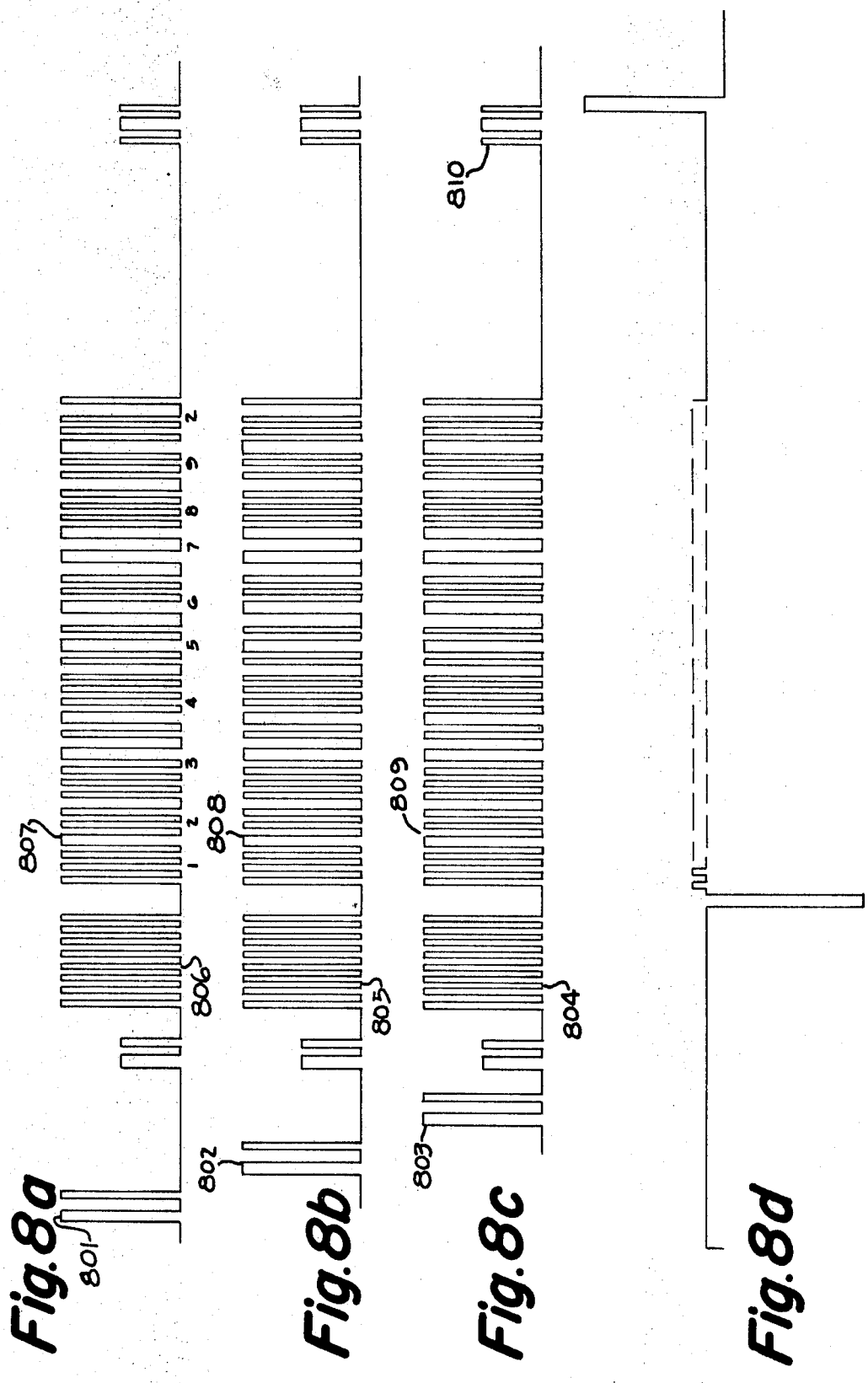

COUNTER CONTROLLER CREDIT VERIFICATION SYSTEM

BACKGROUND OF THE INVENTION

High-speed verification of a customer's credit status has been a longstanding requirement in retail merchandising. For example, a department store chain will accumulate a large number of charge accounts which should not be extended credit for a variety of reasons. For example, the customer's credit card may be lost or stolen. It may be a delinquent account or a slow account or an account referred to an attorney. There may be instructions that a wife only, or the husband only, is to be extended credit, and so on. These and other reasons may exist for not honoring a credit card when it is presented at any one of the branch stores in the system.

The prior practice of compiling lists of charge account numbers which are not to be honored has long been obsolete. It is virtually impossible for sales personnel to check through a total list of the store's "negative" credit accounts before completing each transaction.

The need for a system which will rapidly verify a customer's credit status has been recognized. For example, U.S. Pat. Nos. 3,308,238, Brothman et al., and 3,315,230, Weingart, describe systems in which a credit card presented at a remote location can be checked against information contained at a central location. One of the principal drawbacks of installing such a credit verification system in a chain of stores is that extensive wiring is required. Each store in the chain may require more than 100 counter units at which sales clerks make the transactions. Often a great many stores are involved in the chain. The cost and maintenance of wiring of each of the stores for the plurality of counter units is considerable. Also, the problem of interconnecting remote stores with a central memory is considerable.

In addition to the provision of a plurality of counter units in each store another requirement is for a unit in each store for use by the credit manager. Such a unit should provide an indication to the credit manager of the reason why a credit card presented for purchase has not been honored. This allows for a quick disposition of the matter. For example, in the case of a lost or stolen card, the bearer could be apprehended. In the case of delinquent or overextended accounts, the card could be returned to the individual informing him that all future purchases would be on a cash basis until his account is paid up and in good standing.

The foregoing requirements of credit verification systems are met by the system presently to be described.

SUMMARY OF THE INVENTION

This invention relates to a system for verification of a customer's credit status in response to entry of a charge account number at remote locations and more particularly to a system which can be easily installed and maintained with two-wire lines interconnecting all of the major components of the system.

It is an object of the invention to provide a credit verification system including a central processor having storage means for storing signals representing charge account numbers and a plurality of counter units at remote locations all interconnected through distributor units to the central processor unit over two-wire lines.

It is a further object of the present invention to provide a credit verification system of the type described above which includes distributor units for time division multiplexing of messages to and from each of the counter units and which distributor units can be interconnected with other distributor units to provide maximum flexibility in an installation of a complete system.

It is a further object of the present invention to provide a credit verification system of the type described above in which an authorizer unit is provided in each store for use of the credit manager in monitoring and supervising the transactions taking place in the system.

It is a further object of the present invention to provide counter units which automatically encode charge account numbers for transmission over two-wire lines and which automatically respond to signals from the central processing units to either emboss the sales slip or eject the credit card.

The foregoing and other objects, features and advantages of the invention will be better understood from the following description taken in conjunction with the drawings.

DESCRIPTION OF THE DRAWINGS

FIGS. 4a—4g together show the logic diagram of the counter unit;
FIG. 4h shows the manner in which FIGS. 4a—4g fit together;
FIG. 6e shows the manner in which FIGS. 6a—6d fit together;
FIGS. 8a—8c are waveforms showing the signals on the lines between distributors;
FIG. 8d shows the waveform on the line to a counter unit corresponding to the operation depicted in FIGS. 8a—8d;
FIG. 9c shows the manner in which FIGS. 9a and 9b fit together.

TABLE OF CONTENTS

Figure 1:
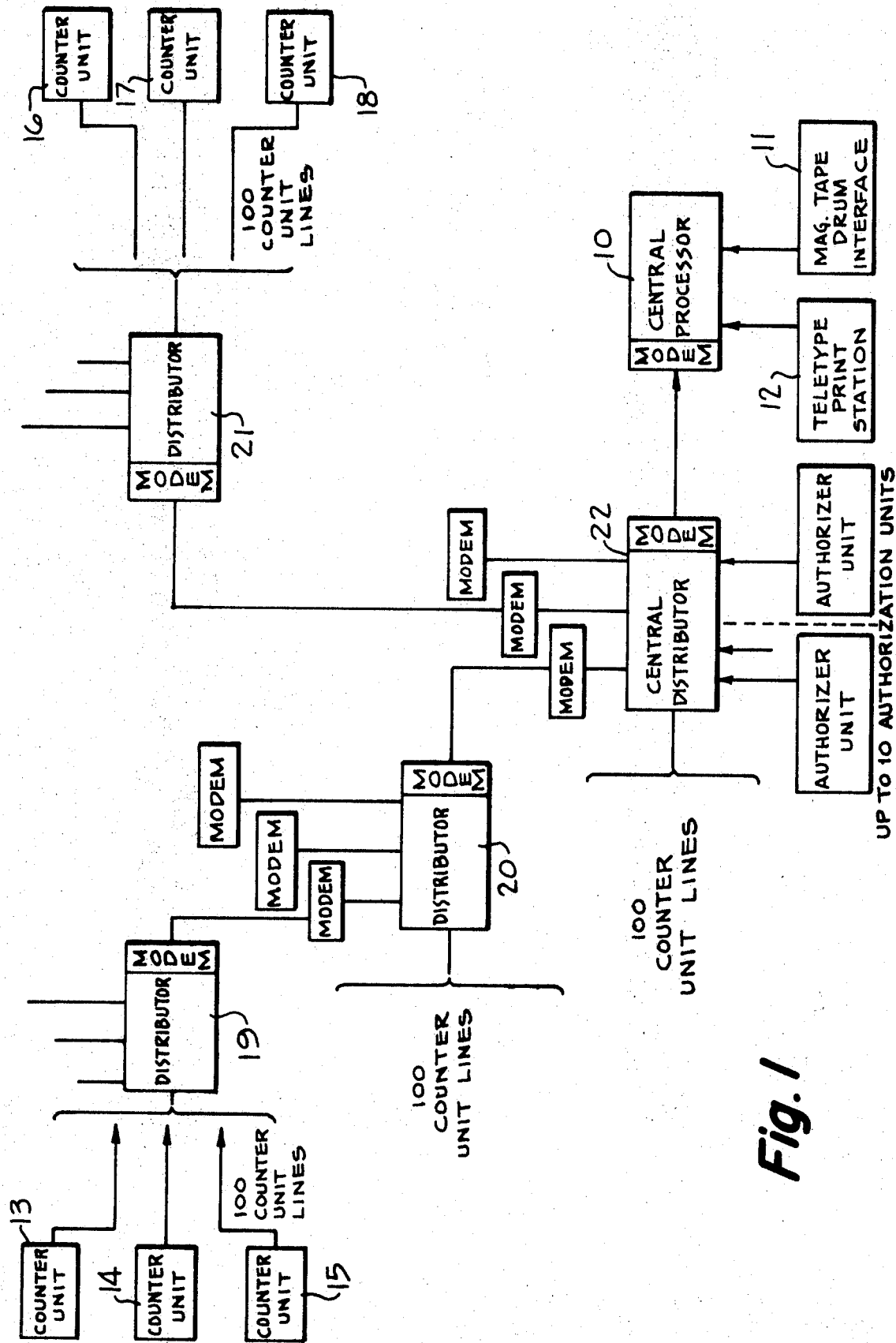
FIG. 1 shows a block diagram of the system.
Figure 2:
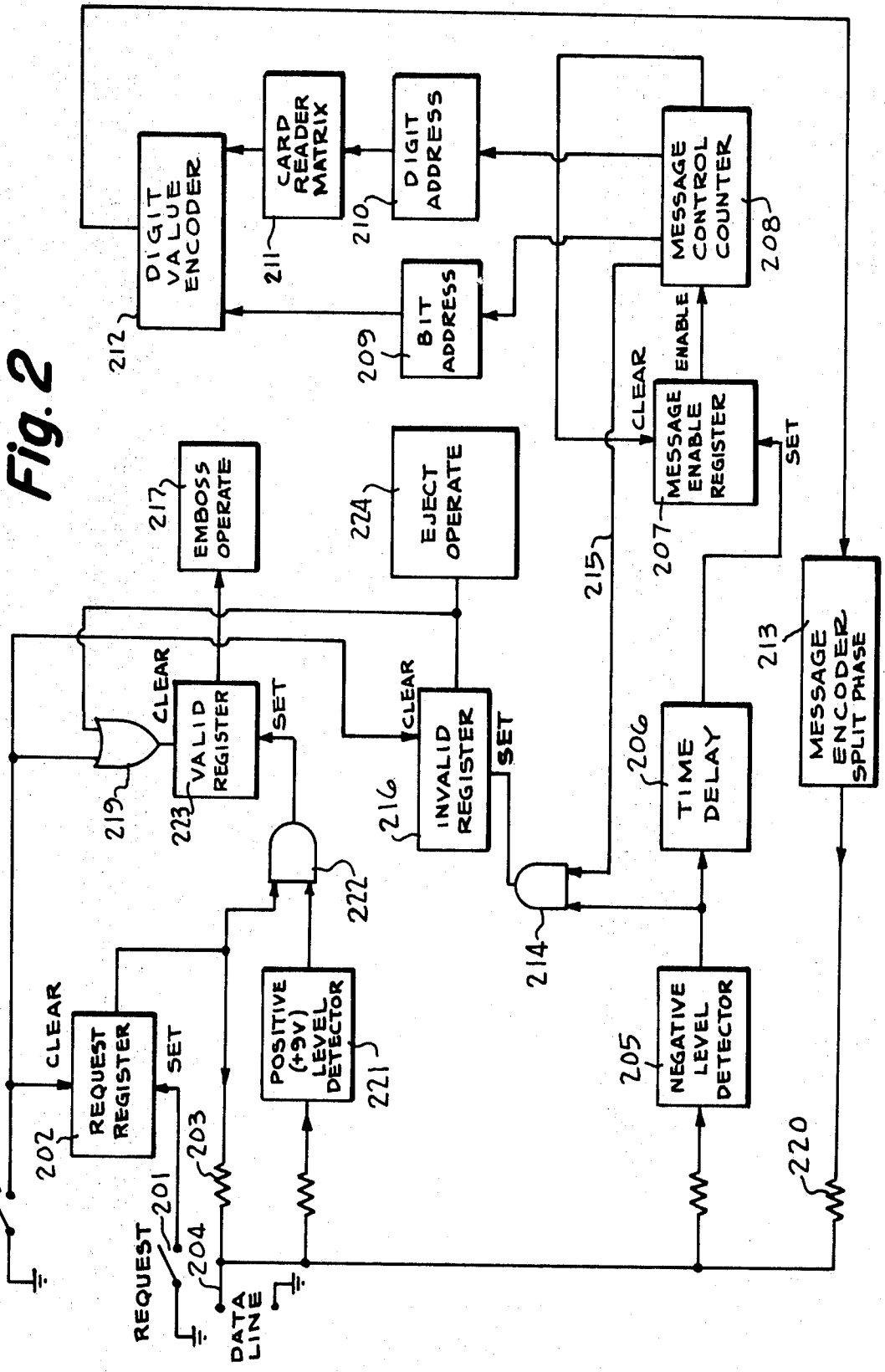
FIG. 2 shows a block diagram of the counter unit.
Figure 3A:
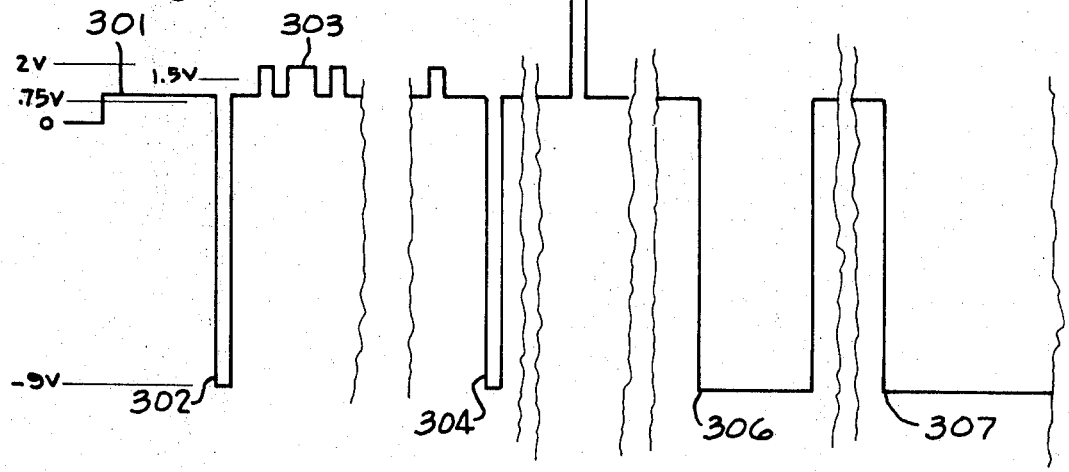
FIGS. 3a and 3b are waveforms of signals appearing on the data line between the counter unit and a distributor unit.
Figure 3B:
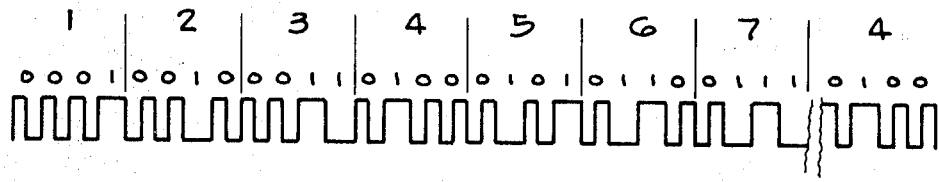
Figure 4A:
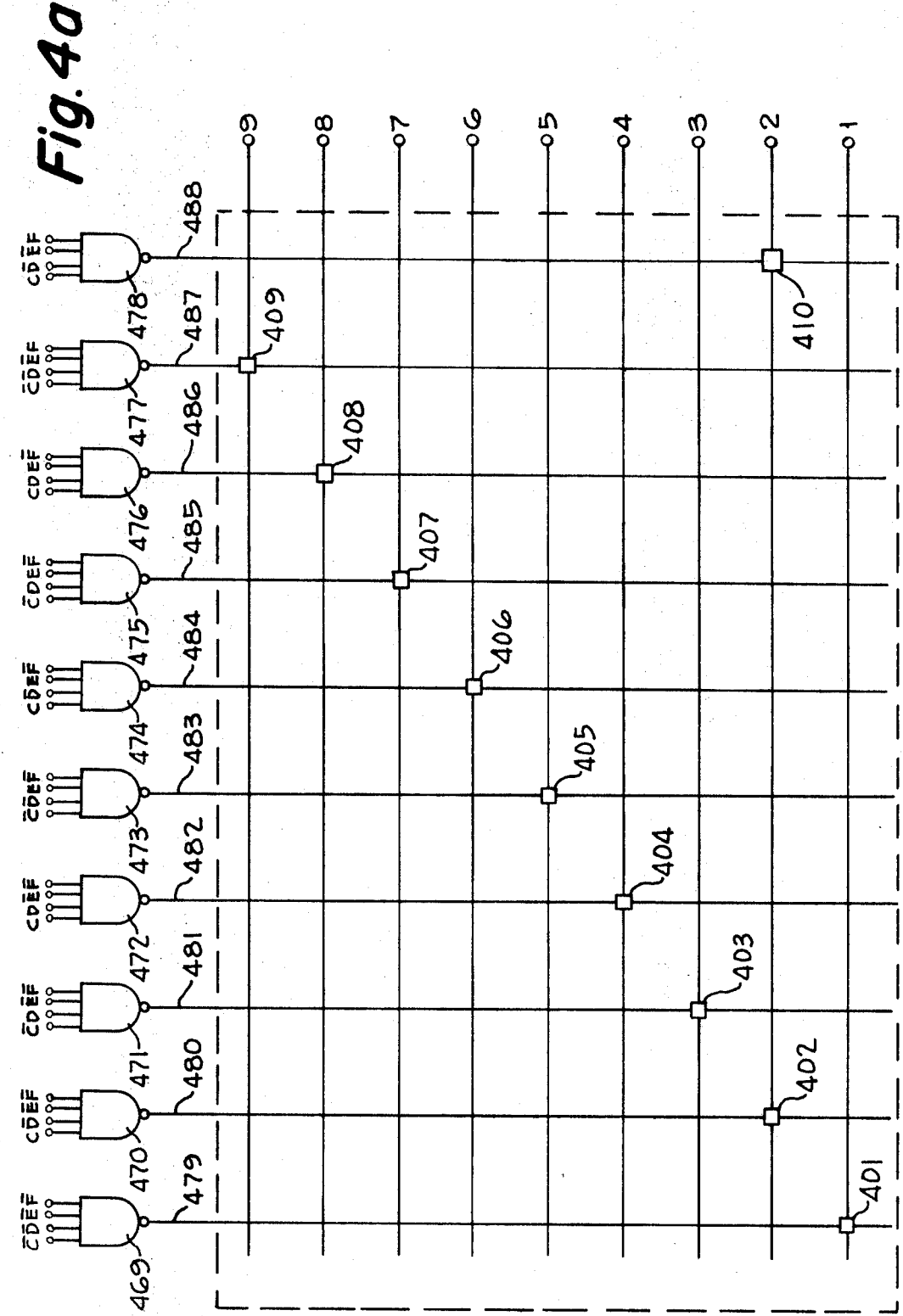
Figure 4B:
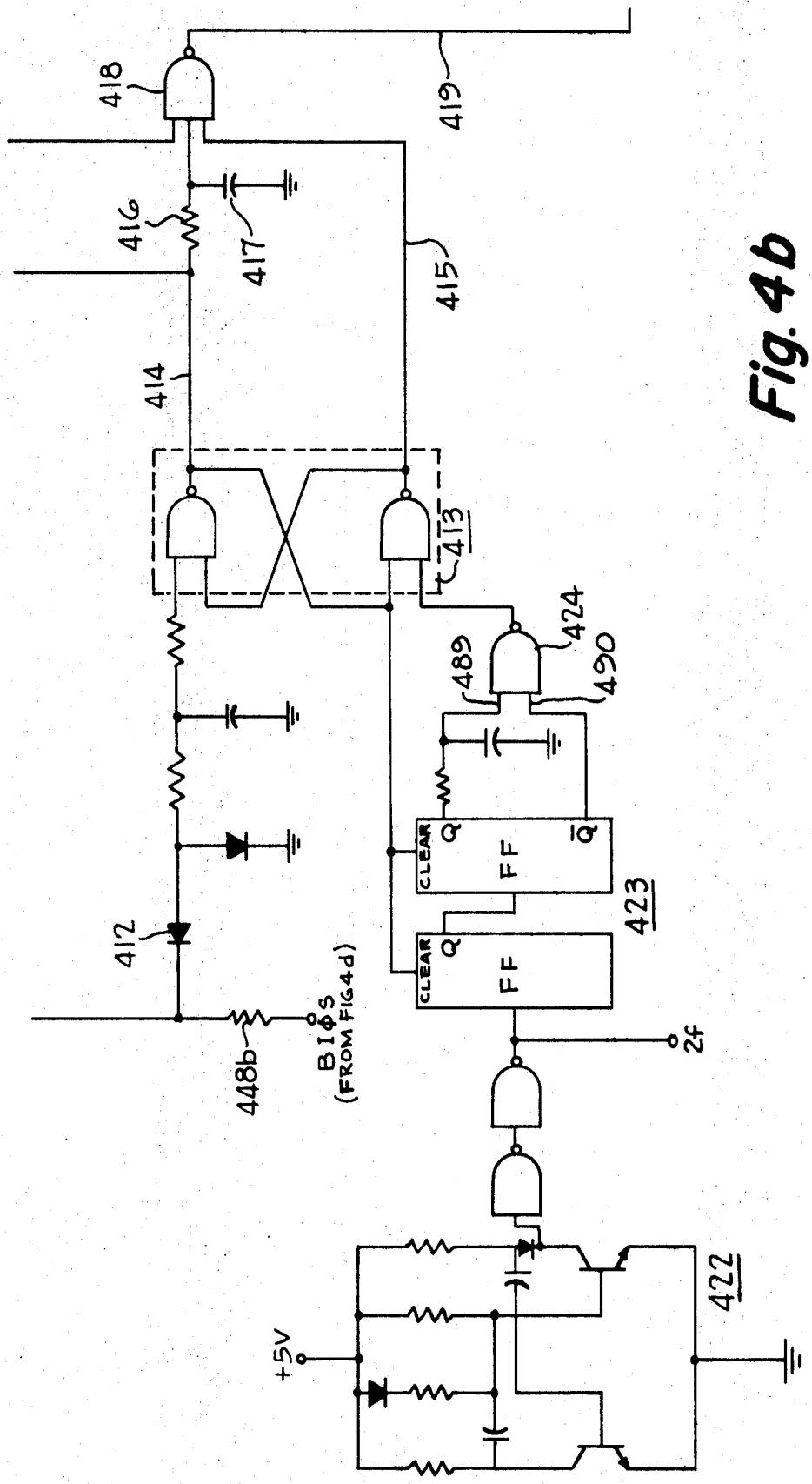
Figure 4C:
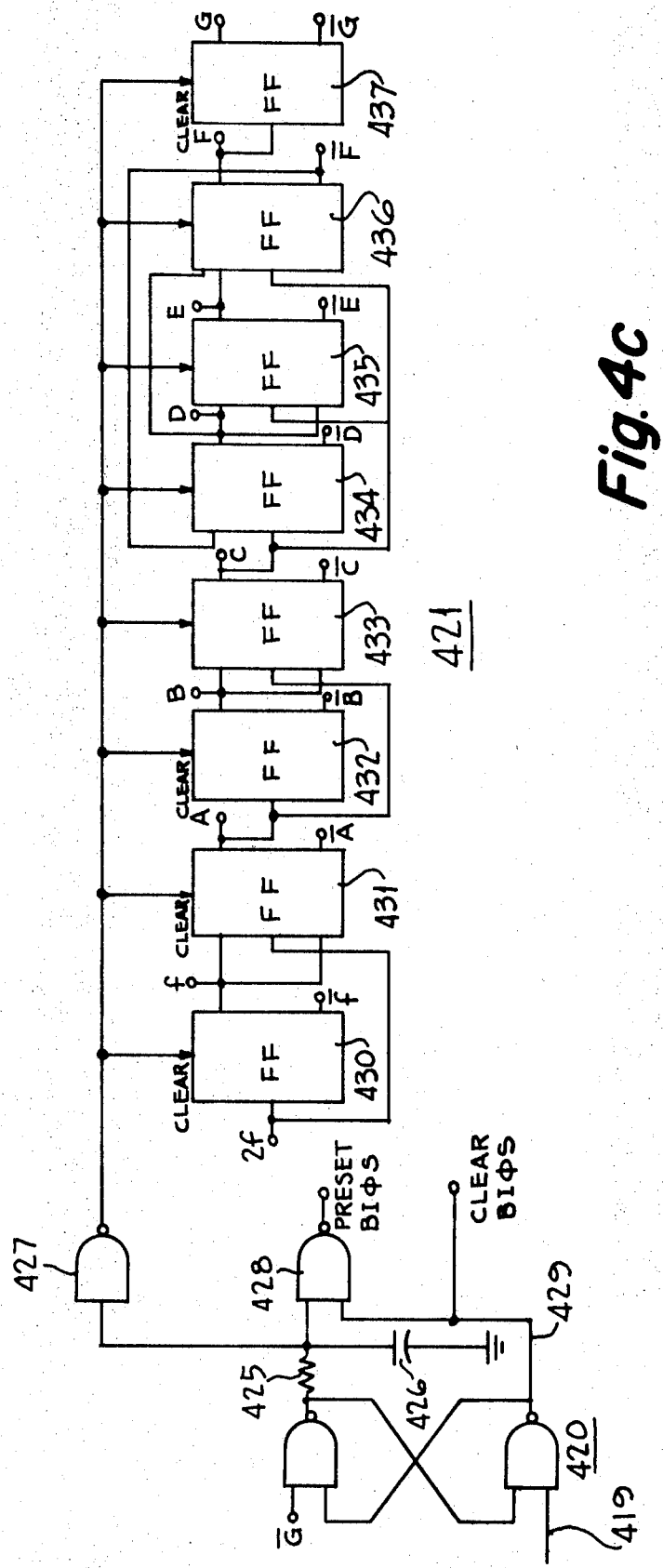
Figure 4D:
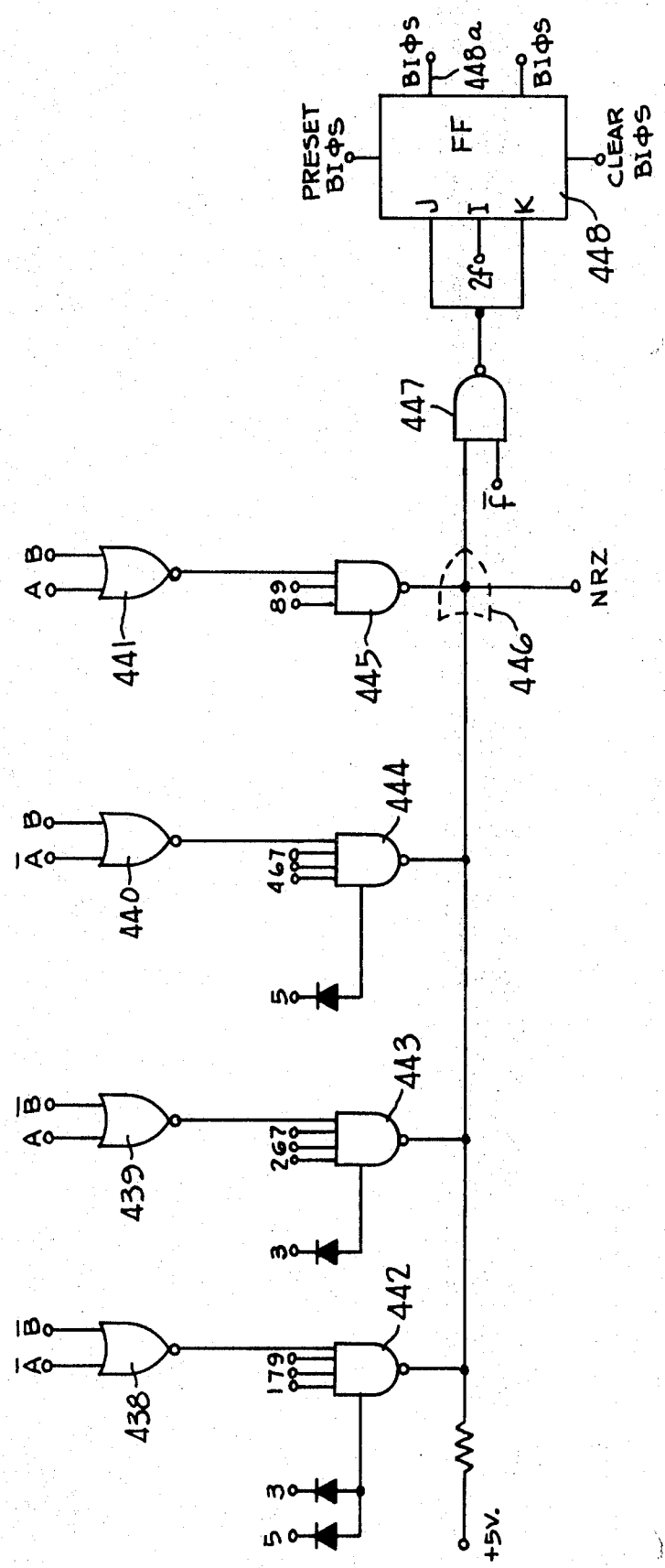
Figure 4E:
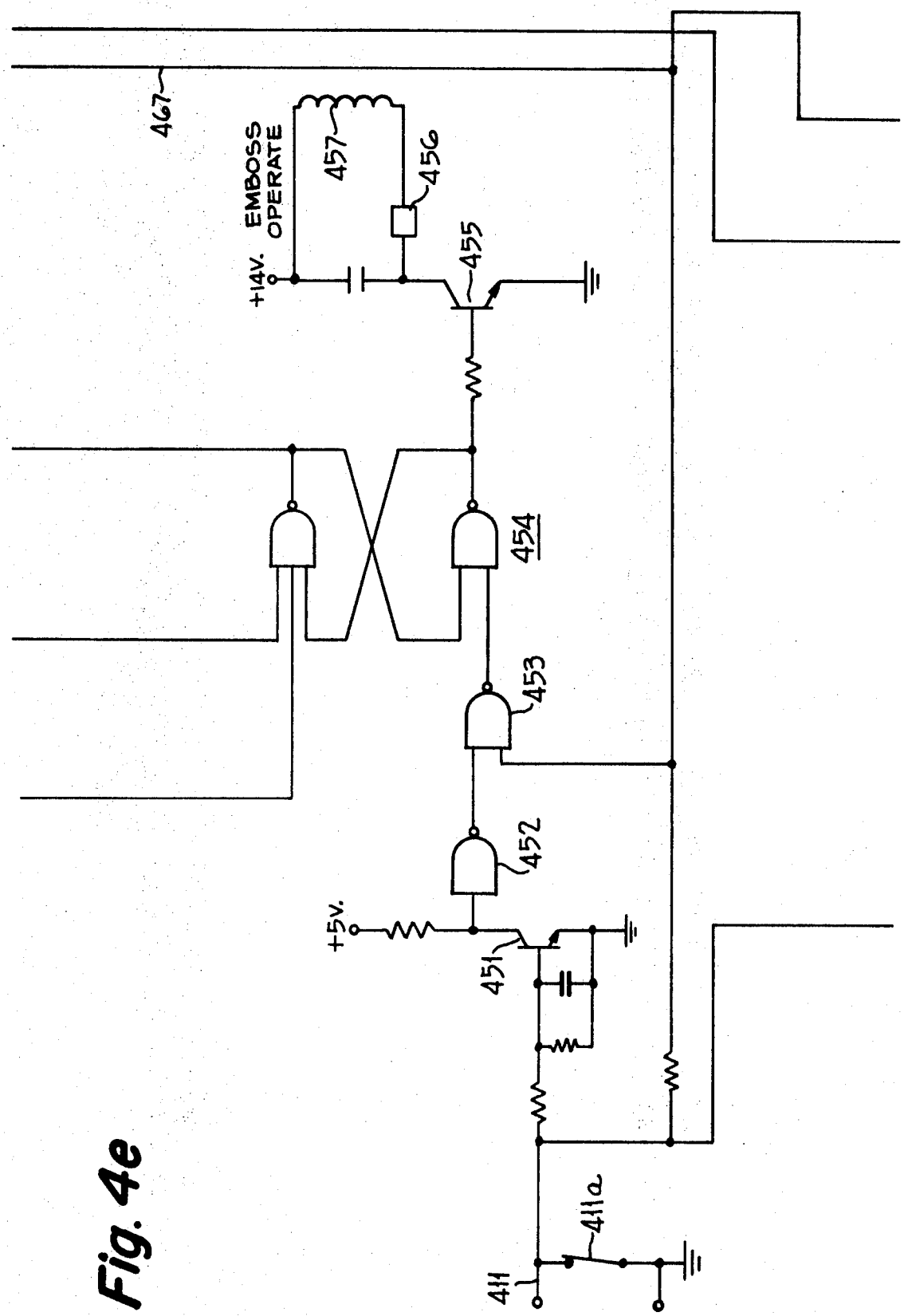
Figure 4G:
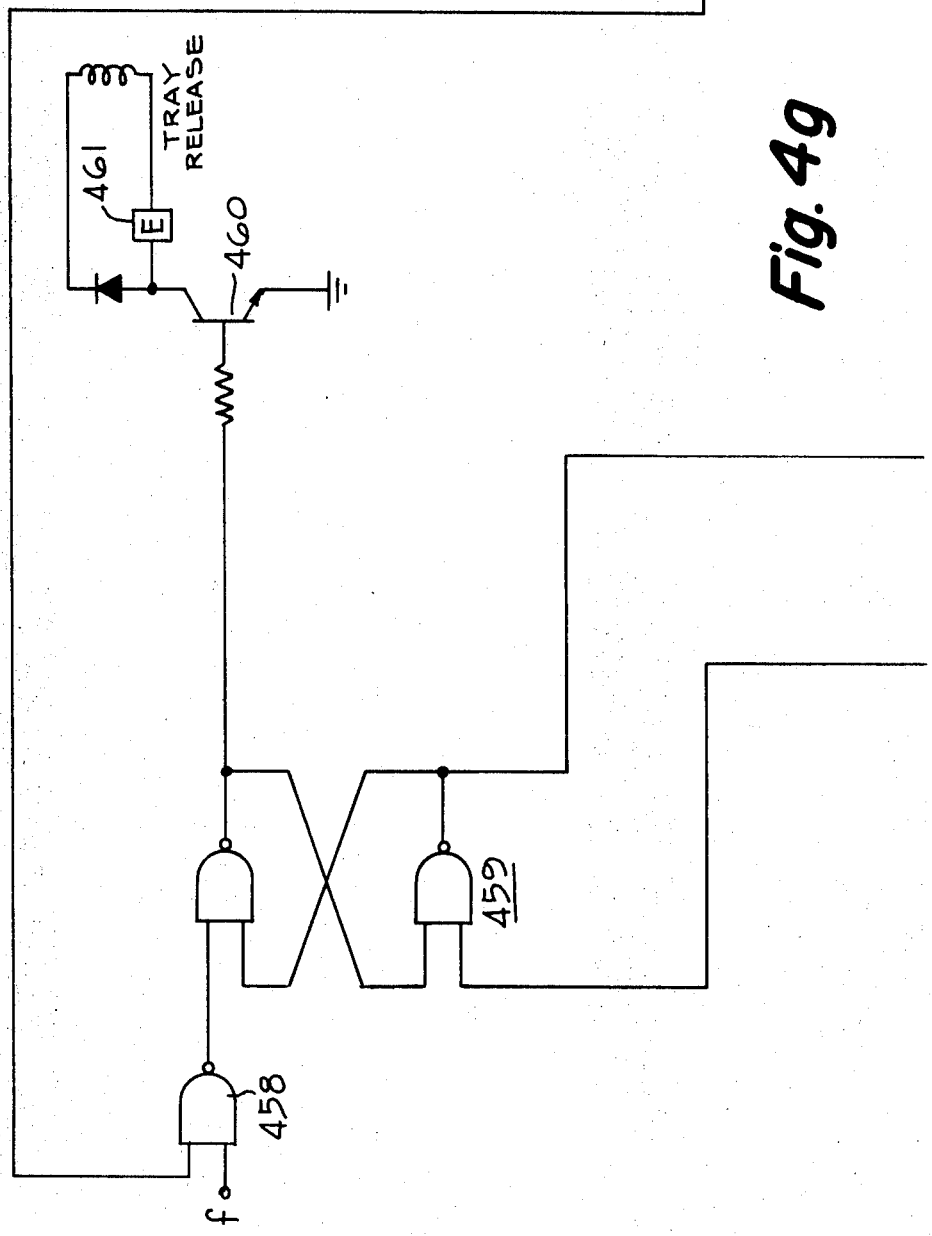
Figure 5:
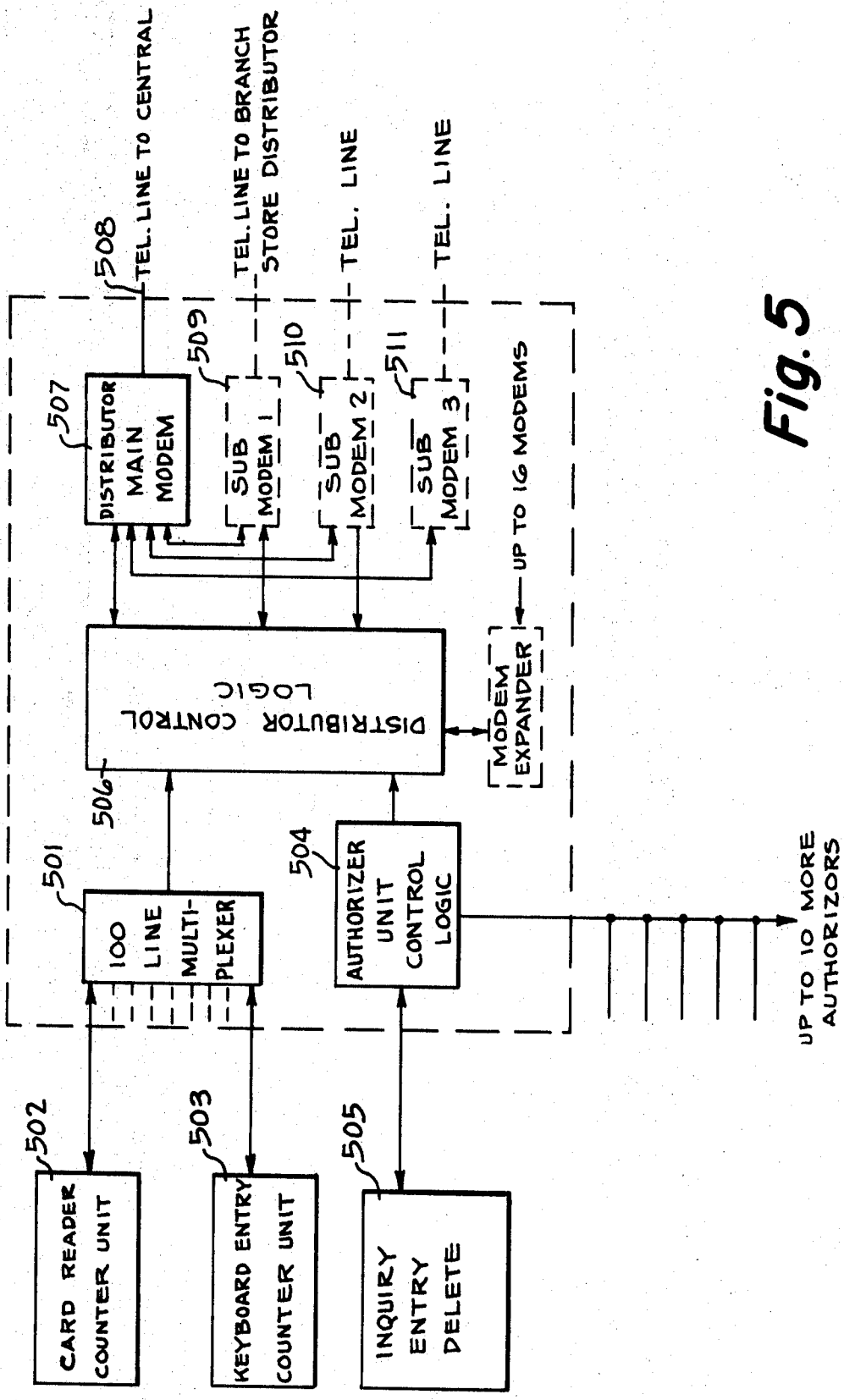
FIG. 5 is a block diagram of the distributor unit.
Figure 6A:
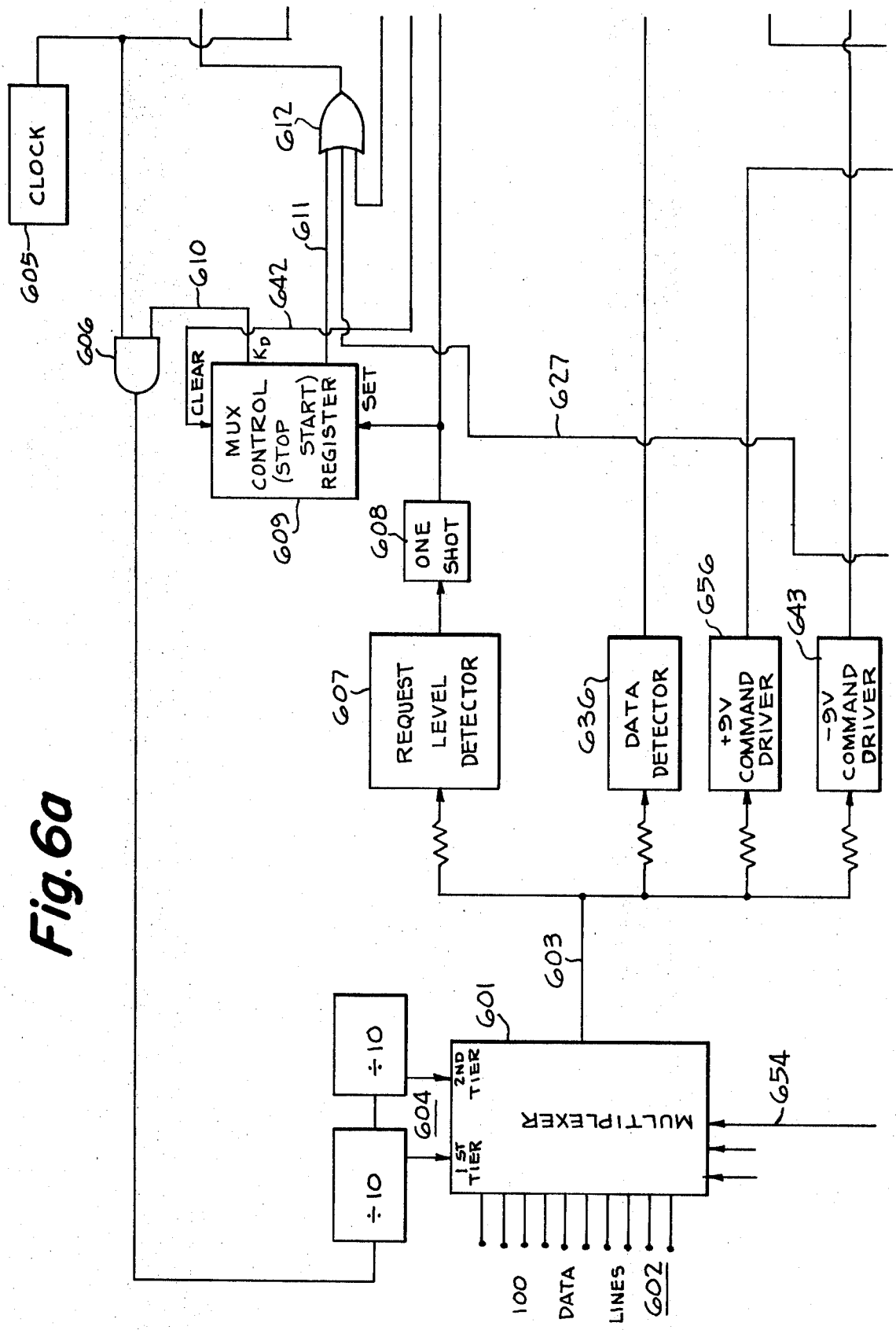
FIGS. 6a—6d show a logic diagram for the distributor unit.
Figure 6B:
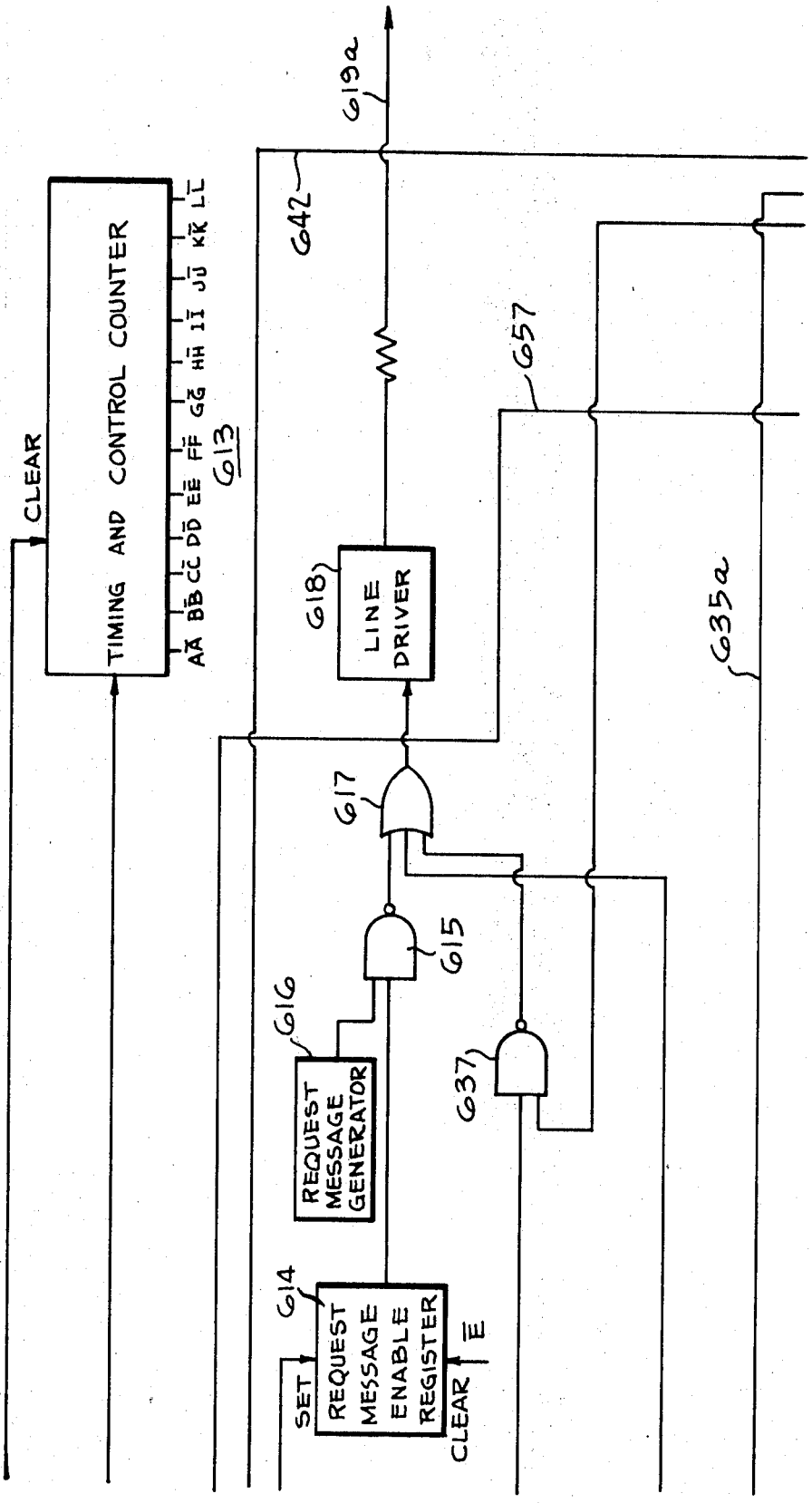
Figure 6C:
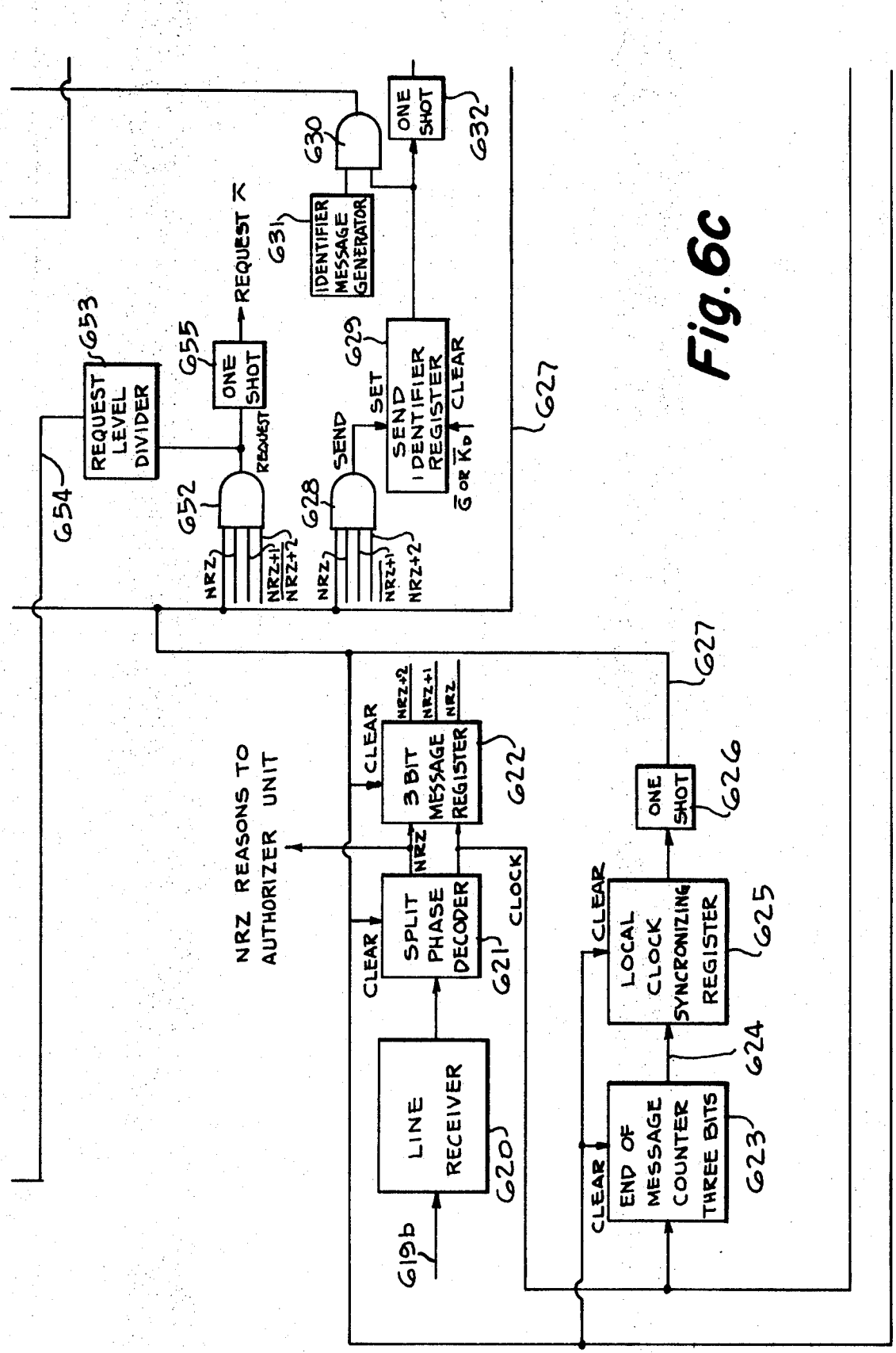
Figure 9A:
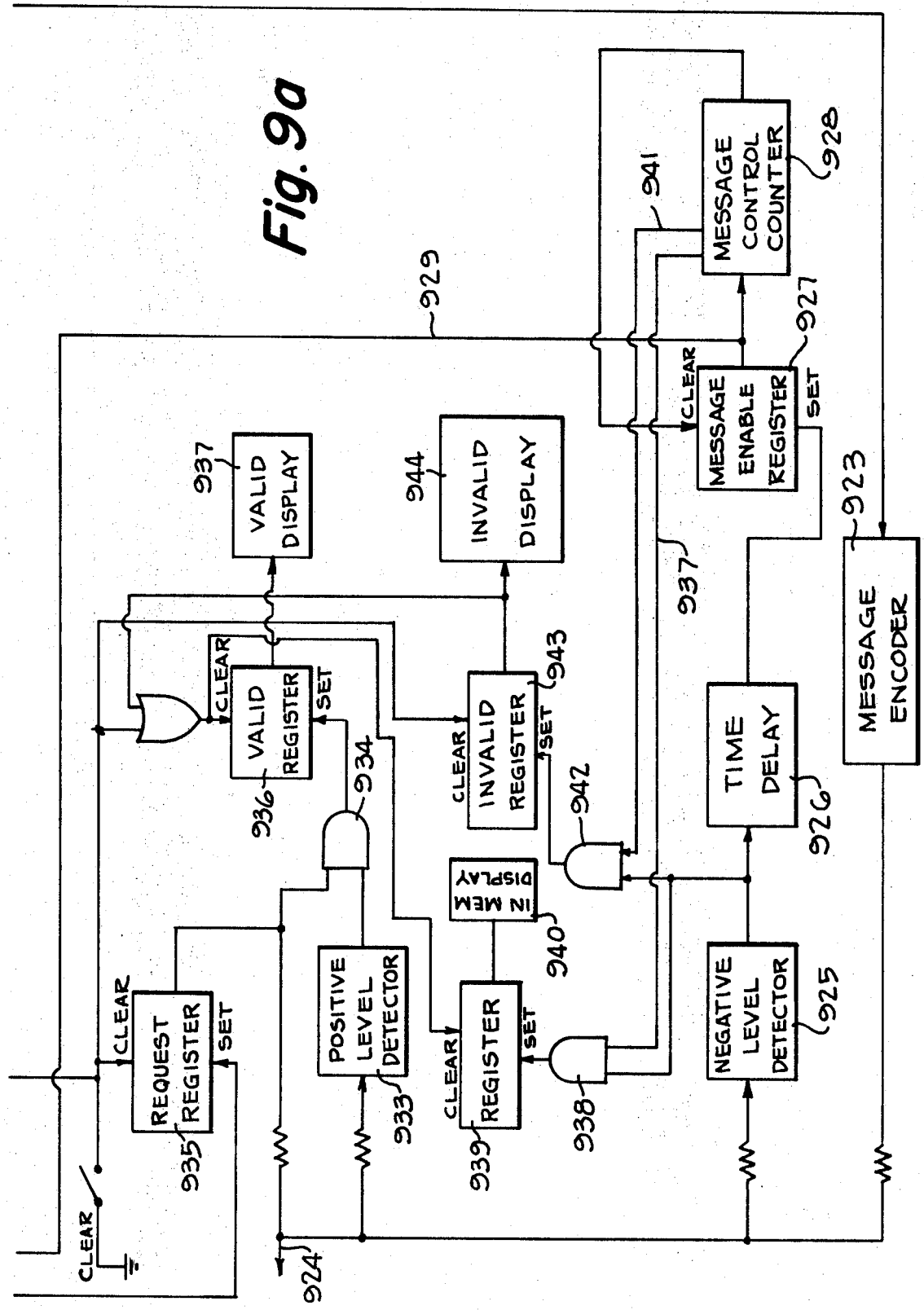
FIGS. 9a and 9b together are a block diagram of the authorizer unit.
Figure 9B:
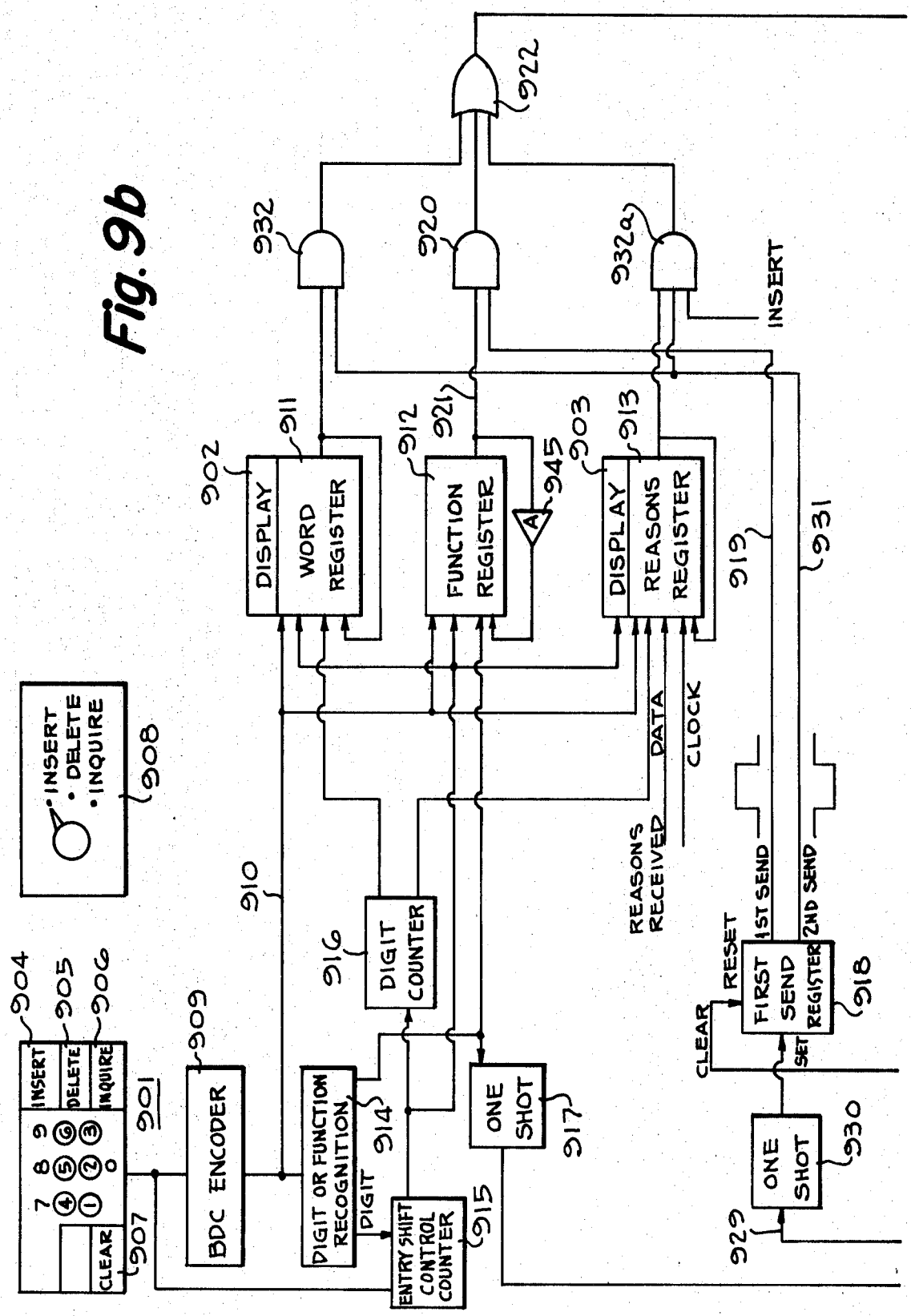
Figure 10:
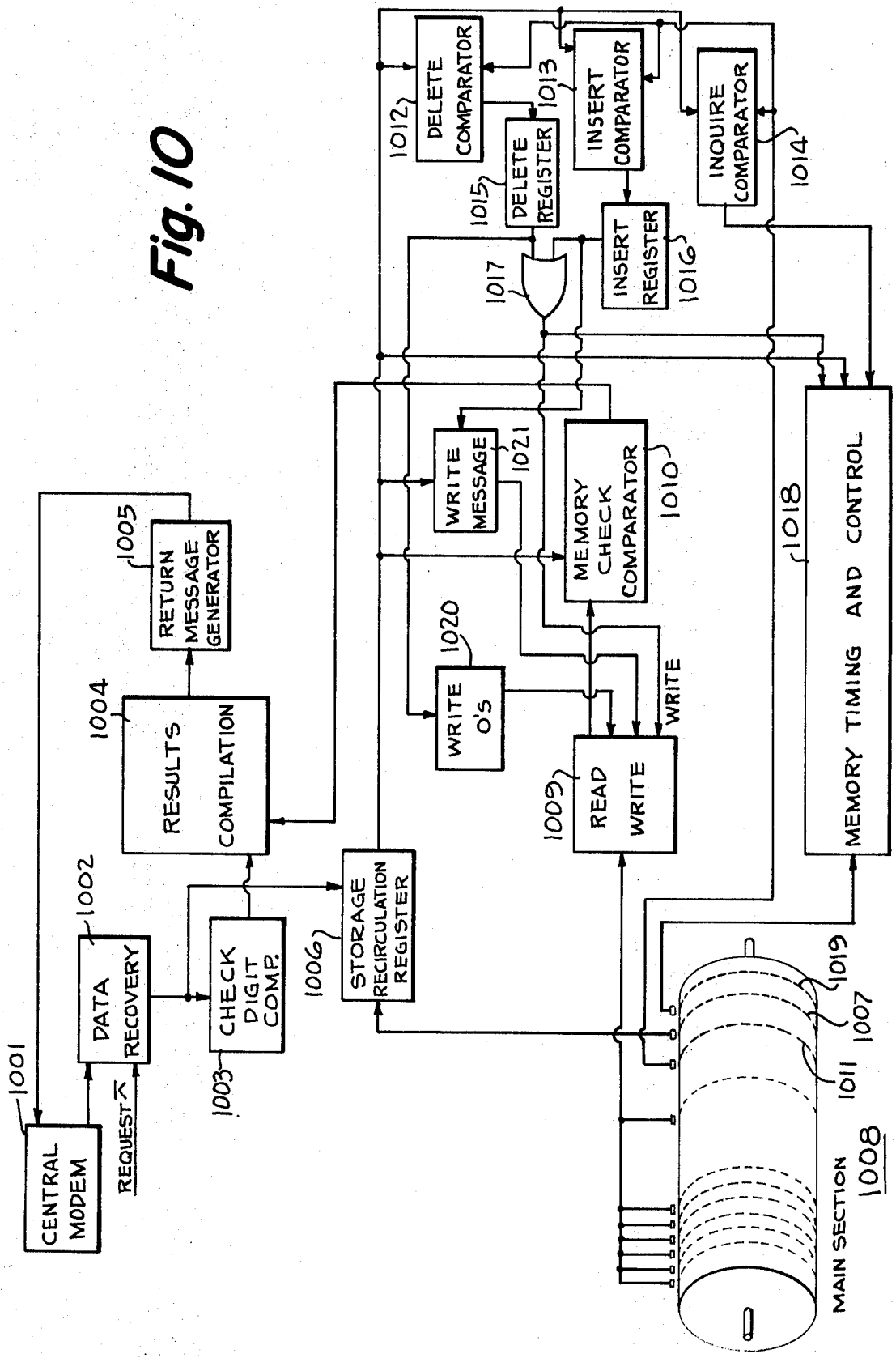
FIG. 10 is a block diagram of the central processor unit.

The system will be understood from the following detailed description which has been divided into the following sections which are set forth here for convenience of reference:
1.0—Timing and Components
2.0—The Overall System, Block Diagram, FIG. 1
3.0—Counter Unit, Block Diagram, FIG. 2
   3.1—The Card Reader
   3.2—Request Register, FIG. 4f
   3.3—Negative Level Detector and Message Enable Register
   3.4—System Clock and Time Delay
   3.5—Message Control Counter
   3.6—Bit Address Decode and Digit Value Encoder
   3.7—Digit Address Decode
   3.8—Message Encoder
   3.9—Positive Level Detector, Valid Register and Emboss Operate, FIG. 4e
   3.10—Invalid Register and Eject Operate
4.0—Distributor Unit, Block Diagram, FIG. 5
   4.1—Distributor Unit, Logic Block Diagrams, FIGS. 6a—6d
   4.2—Multiplexer, FIG. 6a
   4.3—Distributor Control Logic, FIG. 6b
   4.4—Distributor Main MODEM, FIG. 6c
   4.5—The Interconnection of Distributor Units
5.0—The Authorizer Unit, FIGS. 9a and 9b
6.0—Central Processor Unit, FIG. 10

DESCRIPTION OF A PARTICULAR EMBODIMENT

1.0 Timing and Components

Figure 1A:
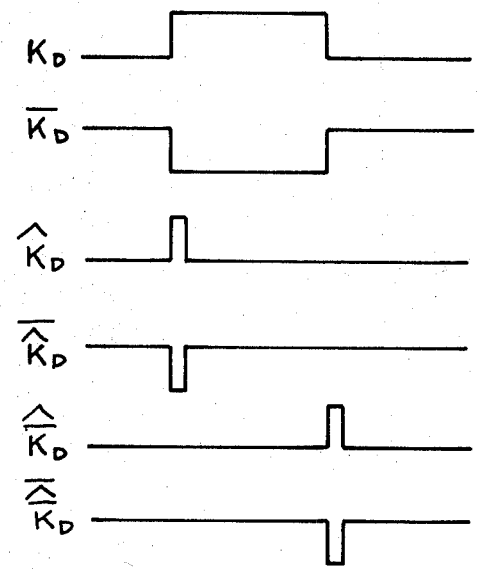
FIG. 1a is an example of timing notations.
Figure 1B:
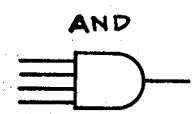
FIGS. 1b—1f show component notations.
Figure 1C:
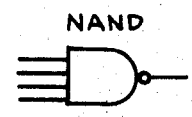

Before proceeding with a description of the system, the timing and components used in the various logic diagrams will be described. Referring to FIG. 1a, there is shown the signal which is denoted $K_D$. The inverse of this signal is denoted $\overline{K}_D$. The pulse which is generated at the leading edge of $K_D$ is denoted $\hat{K}_D$. The inverse of this signal is denoted $\overline{\hat{K}_D}$. The pulse which is generated at the trailing edge of $K_D$ is denoted $\hat{\overline{K}}_D$. The inverse of this signal is denoted $\overline{\hat{\overline{K}}_D}$.

Figure 1D:
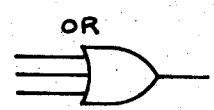
Figure 1E:
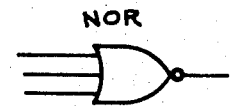

The symbols used for AND gates, NAND gates, OR gates and NOR gates are respectively shown in FIGS. 1d—1e.

Figure 1F:
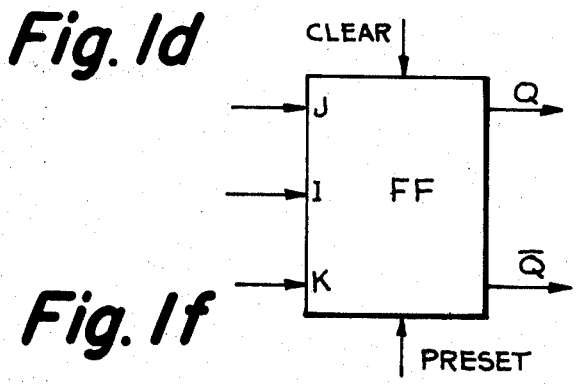

FIG. 1f shows the symbol used for flip-flops. The flip-flops may be of the type commercially available from the Texas Instrument Co. The flip-flop is an SN 7476NTI master slave flip-flop.

2.0 The Overall System, Block Diagram FIG. 1

The credit verification system includes a central processor unit 10 having storage means for storing signals representing charge account numbers of customers whose credit is not to be honored. Alternatively, the central processor unit may store charge account numbers of customers whose credit is to be honored, or all charge account numbers may be stored with an appropriate indication of credit status.

As optional, peripheral equipment, the central processor 10 has associated therewith a magnetic tape drum interface 11 and a teletype print station 12. By means of the magnetic tape drum interface, the contents of the memory in the central processor may be periodically updated, or read out, for use, for example, by electronic data processing of the customer's charge accounts. The teletype print station 12 prints out a record of all negative sales activity. That is, each time that a credit card whose charge account is not to be honored is used, there will be a printout to provide a record. Also, the teletype print station 12 makes a record of all entries into and deletions from the memory of the central processor unit.

The system further includes a plurality of counter units which are located at the remote locations, for example, the different branch stores of the chain interconnected by this system. In FIG. 1, counter units 13—15 are shown for one store and counter units 16—18 are shown for another store. Each of these counter units includes circuitry for generating a request for service upon entry of a charge account number and means for encoding the charge account number as an electrical signal. The counter units 13—15 are each connected through a single two-wire line to a distributor unit 19. As many as 100 counter units may be connected to each distributor. The distributor 19 is connected through modulator-demodulators (MODEMS) to another distributor unit 20. The connection between distributors is also over a two-wire line and may be over a telephone line if the distance is great.

Distributor units 19, 20 and 21 are all shown as connected through telephone lines and modulator-demodulator units to another distributor unit, in this case the central distributor 22.

Each of the distributor units 19—22 includes a multiplexer for scanning each of the counter units connected to the input of that distributor unit and for servicing these counter units in response to a request for service. The codes from the counter unit are transmitted to the central processor 10 which compares the encoded charge account number with the numbers contained in memory.

An important aspect of the present invention resides in the transmission of the charge account numbers over two-wire lines. In the system which is actually described, all of the signals are transmitted over single two-wire lines. No clock pulses are transmitted; that is, the system is asynchronous. However, it will be understood that while still making use of the feature of transmitting charge account numbers on two-wire lines, it would be possible to provide an extra wire for transmitting a common clock to all of the system components. In this case, the entire system would be synchronous.

3.0 Counter Unit, Block Diagram, FIG. 2

Each counter unit includes a credit card reader or a keyboard-type input device. The operation of both of these devices is the same insofar as this invention is concerned. While the particular embodiment will be described as including a card reader matrix, it will be appreciated that the same type of switch matrix is available in keyboard-type input devices. (The input device may also be a storage register with data entry means of the type shown in FIG. 9b.)

When a transaction is to be made, the request switch 201 is closed thereby setting the request register 202 which remains set for the remainder of the transaction. The request register 202 applies, through a resistor 203, a +1-volt level to the data line 204. The line 204 is one-half of a two-wire line, the other half being grounded. This two-wire line is connected to a distributor unit.

When the distributor unit next scans this data line during multiplexing, it will sense the +1-volt level on the line 204 and lock onto this data line. (The +1-volt level is indicated at 301 in FIG. 3a which shows the signal on the data line.) The distributor imposes a —9-volt "send" pulse on the data line 204; (—9-volt "send" pulse is indicated at 302 in FIG. 3a).

The —9-volt "send" pulse is sensed by the negative level detector 205 which produces an output. After a time delay, indicated at 206, the message enable register 207 is set. When the message enable register 207 is set, it enables the message control counter 208 to start counting clock pulses.

The message control counter 208 includes eight stages. The outputs of these eight stages are used to encode the credit card number into 10 serial digits each of which includes four serial bit times. The outputs of the stages in the message control counter 208 are applied to the bit address decoder 209 to encode the bit times and they are applied to the digit address decoder 210 to decode the digit times.

Digit address decoder 210 successively produces a zero or low condition on 10 digit address lines which are connected to the card reader switch matrix 211. The output of card reader matrix 211 is a set of digit value lines which are connected to the digit value encoder 212. The digit value encoder 212 produces 10 serial digits each broken up into four bit times and each representing one of the numbers in the credit card number in NRZ (nonreturn to zero) code. The serial NRZ code is applied to a message encoder 213 which produces as an output the credit card number encoded in split phase, or Manchester, code. This code is applied to the data line 204 through a resistor 220. The code, superposed on a request level, causes the data line to be at 2 volts when the encoder 213 output is high and at 1 volt when the encoder 213 output is zero. (The signal on the data line appears at 303 in FIG. 3a.) One example of such a code is shown in FIG. 3b wherein the credit card number 1234567...4 is encoded in split phase code.

The encoded message is transmitted through the distributor to the central processor unit. A number of different responses are possible. If the number transmitted is an invalid number, that is, one that is determined to be improper by reason of error checking, there is transmitted back to the counter unit another "send" signal. This —9-volt send signal is indicated at 304 in FIG. 3a. In this case, the message will be reencoded and resent in the same manner as previously described. Another response indicates that the message sent was valid and that the charge account number is not contained in the memory in the central processor. In this case, a +9-volt "valid" signal is sent and this is indicated as the pulse 305 in FIG. 3a. The +9-volt pulse is detected by the positive level detector 221. The resultant pulse is applied to an AND gate 222. The other input to the AND gate 222 is the request signal. When both a request signal and a valid signal are present at the input of AND gate 222, the valid register 223 is set. The valid register 223 operates a credit card embosser 217. In this case, the transaction is complete; the sale has been made and the credit card is embossed.

When the credit card tray is opened, a clear switch 218 is closed thereby resetting the request register 202 and, through OR gate 219, resetting the valid register 223.

If the message transmitted to the central processor is a charge account number which is contained in memory, there is applied to the data line 204 a −9-volt pulse which is longer in duration than the −9-volt "send" pulse (this "in memory" pulse is approximately 8 milliseconds in duration). The −9-volt "in memory" pulse is indicated at 306 in FIG. 3a. The negative "in memory" pulse is detected by negative level detector 205 which produces an output which is applied to the AND gate 214. Again, the time delay 206 is actuated, the message enable register 207 is set, and the message control counter 208 begins to count.

The line 215 goes up after the first stage in the message control counter has been actuated. If the output of negative level detector 205 is still up, indicating that the negative pulse on the data line is relatively long and is not a "send" pulse, then the output of the AND gate 214 sets the invalid register 216. The invalid register operates the credit card ejector 224.

At least one other response may be present on the data line as a message from the central processor. This "invalid" pulse is a −9-volt pulse of even longer duration (approximately 64 milliseconds) than the "send" pulse. In FIG. 3a this long duration "invalid" pulse is indicated at 307. This pulse indicates that the central processor has determined that an invalid number has been sent out. The response of the counter unit is the same whether the negative pulse is an "in memory" pulse or an "invalid" pulse. In both cases, the credit card ejector will be operated.

Additional registers may be similarly set by detecting different negative pulse widths which are measured by the appropriate decoding of the states of the message control counter so as to display different levels of negative status, e.g., slow or delinquent accounts and lost or stolen cards.

Certain of the advantages of the present invention will be apparent from FIG. 2. Most importantly, all of the messages to and from the counter unit are carried on the single two-wire data line. This is a very important advantage over prior art credit checking systems which required a plurality of lines to connect each counter unit back to the central storage location or the central processing unit. It will be appreciated that the wiring of a department store, for example, is a very costly part of the installation of any credit checking system. Not only does the present invention cut down considerably on initial wiring costs, but also the maintenance of such a system is simpler. The single two-wire lines have a minimum susceptibility to damage during maintenance or redecoration of the store. It can be appreciated that, if a single line is severed during such maintenance operation, the counter unit will be inoperative. In prior art systems, the shorting of a single line out of the plurality of lines resulted in total system downtime. On the other hand, in the system of the present invention damage to a single line will render only that counter unit inoperative and this fault is relatively easy to trace and to repair.

Referring now to FIGS. 4a—4g, there is shown the logic circuitry for a card-reader-operated counter unit.

3.1 The Card Reader

The card reader includes a matrix of switch contacts for encoding the credit card number, shown in FIG. 4a, and also includes certain tray and request switches (shown in FIGS. 4e and 4f) which are actuated when the tray for the credit card is opened and closed.

The card reader itself may be of a commercially available type, one suitable card reader being the type supplied by AMP INCORPORATED, Harrisburg, Pa. In FIG. 4a, there is shown a matrix of switch contacts which are selectively operated by a credit card which is punched in accordance with a particular charge account number. For example, squares have been shown at certain of the matrix points to indicate that a credit card with the charge account number 12345672 has been inserted therein and the indicated switch contacts have been closed. That is, the square at the point 401 indicates that a contact has been closed to denote the number 1. A switch 402 has been closed to indicate the number "2." The contact 403 has been closed to indicate the number "3." Similarly, contacts 404 through 409 have been closed to respectively denote the numbers 4, 5, 6, 7, 8 and 9 in the charge account number and the contact 410 has been closed to indicate the last number "2" in the charge account number. The selective closure of these contacts encodes the charge account number as will be subsequently described.

Other types of card readers, e.g., photoresistive cells, or buffered photovoltaic or photodiode or phototransistor cells, would similarly accomplish the card-reading function.

3.2 Request Register, FIG. 4f

Referring now to FIG. 4e, when the tray bearing the credit card is closed, a tray switch 411a is opened thereby removing ground potential from the data line 411. If the request switch 463 is closed, the data line 411 then assumes a voltage of approximately 1 volt which is imposed on the line 411 by the request register 464 (FIG. 2f).

When the request switch 463 is closed, the request switch sets the request register 464 and the request register will remain in the set condition until the transaction is completed. The request register flip-flop 465, and the inverter 466 connected to its output, apply a high signal to the line 467. This is the request signal, and it will remain up for the remainder of the transaction. Upon termination of the transaction, either by the credit card being embossed, or the tray being opened without embossing, a tray switch 462, which has been opened during the transaction, is closed. This resets the flip-flop 465 in the request register 464.

3.3 Negative Level Detector and Message Enable Register

The data line 411 (FIG. 4e) is connected to the distributor and indicates that a counter unit is requesting service. When the multiplexer in the distributor unit services the particular counter unit requesting service, it transmits a −9-volt pulse which is applied to the line 411. The −9-volt pulse passes through diode 412 (FIG. 4b) and sets the negative level detector including the flip-flop 413. When the flip-flop 413 is set, that is, when it is in its set state, the line 414 is high and the line 415 is low. When the flip-flop 413 is reset, the line 415 immediately switches to the high state. The line 414 switches to the low state, but this switch to the low state is delayed by the network including resistor 416 and capacitor 417. Therefore, for a brief interval, and NAND gate 418 has applied to its three inputs a high voltage condition. The top input is high by reason of a request signal being present on the line 411. The middle input is high by reason of the delay after the setting of flip-flop 413 and the bottom input is high by reason of the immediate switch in condition of this line caused by setting of flip-flop 413. Therefore, the output of NAND gate 418 is a pulse of relatively short duration which is applied over line 419 to set the flip-flop 420 (FIG. 4c). Setting of the flip-flop 420 enables pulses to be applied to a message control counter 421.

3.4 System Clock and Time Delay

In order to synchronize the starting of the message control counter with the clock, the output of the system clock 422 (FIG. 4b) is applied to the counter 423. The system clock 422 produces a train of pulses referred to as the $2f$ pulses. The $2f$ pulses are applied to the negative level receipt time delay including counter 423. When flip-flop 413 is set in response to a negative input on line 411, line 414 is switched to a high state. This lifts the clear inputs on counter 423. Counter 423 is then clocked with the $2f$ pulses. On the fourth pulse, the delayed signal falls on line 489 and the nondelayed signal rises on line 490, when applied to NAND gate 424, results in a negative reset pulse which is applied to flip-flop 413. This results in a delay of the aforementioned pulse on line 419 and places the pulse on line 419 in synchronism with the 2f clock. The delay effected by counter 423 allows for discharge of the stored charge on the line capacitance by pulse 302 (FIG. 3a) prior to placing the encoded data 303 on the line. On low capacity lines, the delay can be omitted.

3.5 Message Control Counter

Referring to FIG. 4c, when the flip-flop is set, it generates a MESSAGE ENABLE signal and the complement of this signal. The complement signal (low during MESSAGE ENABLE time) is delayed by the network including resistor 425 and capacitor 426 and this delayed signal is applied through inverter 427 to the flip-flop stages of counter 421 thereby effecting a delayed lifting of the flip-flop clears. The message enable delayed signal (MESSAGE ENABLE*) at the output of amplifier 427 allows the counters including flip-flops 430-—437 in the message control counter 421 to start counting clock pulses (2f) which are applied to the first flip-flop 430 in the chain. The purpose of delaying the MESSAGE ENABLE signal is so that the message control counter 421 will skip the initial clock pulse. That is, it will allow the first full bit time to be coded.

The complement signal is also applied to a NAND gate 428. The other input to the NAND gate 428 is the MESSAGE ENABLE signal on line 429. The output of NAND gate 428 is the signal PRESET BI$\phi$S, the function of which will be later described. The signal on the line 429, referred to as "CLEAR BI$\phi$S," is used to clear the split phase coder as will be subsequently described.

3.6 Bit Address Decode and Digit Value Encoder

The message control counter 421 is used to control the bit decode, FIG. 4d, and the digit address decode in FIG. 4a. Each digit is made up of four bits. Therefore, the outputs of the flip-flops 431 and 432 (FIG. 4c), referred to as the A, $\bar{A}$ and B, $\bar{B}$ outputs, respectively, are decoded by the NOR gates 438-—441 (FIG. 4d). In order to code each or the digits determined by contact closures of the card reader (FIG. 4a), the digit value lines (1, 2, 3, . . . .9) are applied to the NAND gates 442—445. The outputs of NAND gates 442—445 are connected in a "phantom OR" connection indicated by the dotted OR gate 446. When any of the outputs of NAND gates 442-—445 are low, the output of OR gate 446 will be low. Only when the outputs of all NAND gates 442—445 are high, will the output of OR gate 446 be high.

The output of OR gate 446 is a serial NRZ (nonreturn to zero) pulse train.

Assume that the digit "1 " is being coded. The digit "1 " is 001 in binary code. In NRZ, there is no transition between the first and second bit times and no transition between the second and third bit times. There is a transition between the third and fourth bit times. Therefore, the output of OR gate 446 will be "0" during the first, second and third bit times and will be a "1," that is, high, during the fourth bit time.

3.7 Digit Address Decode

The digit address decoder includes the NAND gates 469-—478 in FIG. 4a. These NAND gates are addressed by the outputs of flip-flops 433—436 in FIG. 4c. *These outputs are respectively denoted C, $\bar{C}$, D, $\bar{D}$, E, $\bar{E}$, and F, $\bar{F}$. The outputs of NAND gates 449—478 are respectively connected to the digit address lines 479—488.*

During the first four bit times of message encoding (that is, during the time that the first digit is to be encoded) the output of NAND gate 469 is low. In the example under discussion, we have assumed that the first digit is a "1 " denoted by the switch 401 being closed. Therefore, during the first four bit times a zero level is imposed on the digit value line denoted "1. " As previously explained with regard to FIG. 4d, these digit value lines are selectively applied connected to the NAND gates 442—445 so that the first digit is encoded as a "1 " in NRZ code.

During the next four bit times (that is, during the time that the second digit is to be encoded) the output of NAND gate 470 is zero, digit address line 480 is zero and this level is connected through switch 402 to the digit value line denoted "2. " During the time that the third digit is to be encoded, the output of NAND gate 471 is zero; during the time that the fourth digit is to be encoded, the output of NAND gate 472 is zero and so on until all "10 " digits of the credit card number are encoded.

3.8 Message Encoder

The NRZ bit train, at the output of OR gate 446 (FIG. 4d), is converted to split phase code by the split phase encoder including NAND gate 447 and flip-flop 448. The output of NAND gate 447 is always high during the second half of a bit time. This enables clocking of the flip-flop 448 at the end of each bit time. During the first half of a bit time, the output of NAND gate 447 will be low if the NRZ is a "1 " during that bit time. The output of NAND gate 447 is high during the first half of a bit time if the NRZ code is a zero. If the NRZ is a zero, the flip-flop 448 will be toggled (that is, the condition will be switched) at the middle of the bit time. Note that 2f clock pulses are applied to the toggle input (denoted I) of flip-flop 448. If the NRZ code is a "1" then the flip-flop 448 will not be toggled during the first half of the bit time because the J and K inputs are low. The flip-flop 448 will be toggled during the second half of the bit time because the output of NAND gate 447 is always up during the second half of the bit time. The result is that the output 448a of the flip-flop impressed thereon a code which is commonly referred to as a (biphase or split phase) space code or Manchester space code. This code has previously been used in telemetry. The characteristics of this code are that there is a transition at the end of each bit time. There will be a transition in the middle of the bit time if the data being encoded is a "0"; there will be no transition in the middle of the bit time if the data being encoded is a "1." The split phase code used in accordance with this invention is very desirable because the spectral density of the signal does not include a DC term. An ordinary telephone line having a bandwidth of 300 to 3,000 Hertz will handle the standard 1,200, 1,800 or 2,400 band transmission.

The line 448a is connected to the data line 411. Referring back to FIG. 4b, the split phase code (BI$\phi$S) is connected through resistor 448b to the data line 411.

3.9 Positive Level Detector, Valid Register and Valid Emboss, FIG. 4e

Assuming that the message sent to the distributor unit, and thence to the central processing unit is a valid code and that the charge account number is not in the central processor memory, then a 9-volt positive pulse is sent back to the counter unit and is applied to the data line 411. The 9-volt positive pulse turns on the transistor 451. The signal at the collector of transistor 451 is inverted in amplifier 452 to produce at the output of that amplifier a valid level signal. The existence of this valid level signal together with the request signal, applied to the other input of NAND gate 453, sets the valid register 454. When the valid register 454 is set, the transistor 455 is turned on thereby picking up the motor relay 456 and enabling the motor 457 to validate the credit card purchase.

3.10 Invalid Register and Invalid Display

Assume now that the transmitted code was not a valid request. That is, either the charge account number was contained in memory at the central processor or an invalid number was sent. Then, the data line 411 will have imposed thereon a −9-volt level. (This −9-volt level will vary in duration depending upon whether an invalid number has been set or a number has been sent which is in memory, but insofar as FIGS. 4a—4g are concerned, the result is the same.)

The —9-volt level will set the negative level detector flip-flop 413 (FIG. 4b). The result is that the line 414 is held to a high state. In order to distinguish an invalid message from a send message, the voltage on line 414 is applied to an NAND gate 458 (FIG. 4g). If the line 414 is high at the time that the message control counter 421 produces an $f$ signal, there is an indication that an invalid message has been received. (If the high voltage on line 414 has been caused by a send message, it would have terminated before the message control counter produced the $f$ signal.) the negative message length discriminator including NAND gate 458 produces an output, the invalid register 459 is set. In this case, the transistor 460 is turned on which energizes the tray relay 461. In this case, the tray of the credit card embosser is opened without embossing the credit card.

4.0 Distributor Unit, Block Diagram, FIG. 5

Each distributor includes a multiplexer 501 for servicing up to 100 data lines connected to counter units. In FIG. 5, a card-reader-type counter unit has been indicated at 502 and a keyboard-entry-type counter unit has been indicated at 503.

The distributor also has authorizer unit control logic 504 for servicing a plurality of authorizers. One authorizer unit 505 has been indicated in FIG. 5.

The main distributor control logic 506 interconnects a counter unit, or an authorizer unit through the main MODEM 507 to the telephone line 508 which is connected to the central processing unit. MODEMS 509—511 may also be provided to interconnect the distributor with additional telephone lines which may, for example, be connected to distributor units at branch stores.

4.1 Distributor Unit, Logic Block Diagrams, FIGS. 6a—6d

The operation of the distributor unit will be more apparent from the more detailed block logic diagrams which follow. FIGS. 6a—6d show the logic circuitry of line multiplexer 501, authorizer unit control logic 504 (for one authorizer unit), distributor control logic 506 and the distributor main MODEM 507. There will subsequently be explained the manner in which the logic circuitry is expanded to accommodate other authorizer units and other MODEMS for connection to branch stores, for example.

4.2 Multiplexer, FIG. 6a

The multiplexer 601 preferably includes solid-state switching devices for sequentially connecting 100 data lines 602 to the output line 603. The sequential connection of each input line to the output line is under the control of the multiplex control counter 604.

Clock pulses from the clock 605 normally pass through AND gate 606 to sequentially drive the multiplex control counter 604 in the multiplexing operation.

When a +1-volt request signal appears on any one of the data lines 602, the next time the data line is scanned this +1-volt level will appear on the line 603. The request level detector 607 responds to this +1-volt level to produce an output which triggers one-shot 608. The resultant pulse is used to set the multiplex control register 609. When this register is set, the output 610 is down. The AND gate 606 is no longer enabled. No further clock pulses are supplied to multiplexer control counter 604. The data line with the request level thereon will remain connected to the line 603 until the termination of the transaction.

4.3 Distributor Control Logic, FIG. 6b

When the multiplex control register 609 (FIG. 6a) is set, the output 611 acts through OR gate 612 to clear the timing and control counter 613 (FIG. 6b) and enable it to start counting. Timing and control counter 613 includes 12 stages of flip-flops. As these stages are counted, the outputs A $\bar{A}$, B $\bar{B}$ ... L $\bar{L}$ are successively produced. These are used for timing purposes as will be subsequently explained.

When a request is received, the one-shot 608 also sets the request message enable register 614. The register 614 is not reset until the fifth stage of timing and control counter 613 produces the $\bar{E}$ signal.

Figure 7A:
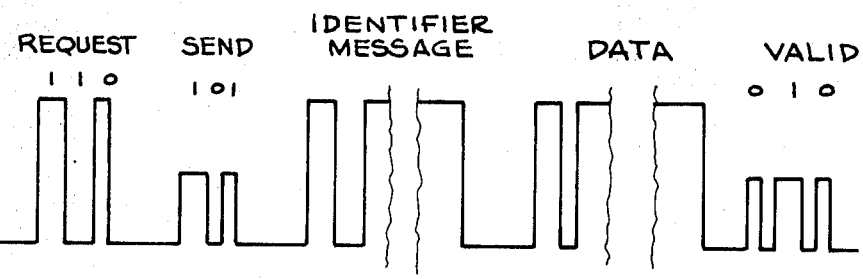
FIG. 7a shows waveforms appearing on the line between the distributor and the central processor.

When the request message enable register 614 is set, one output enables the AND gate 615. The request message generator 616 continuously generates a three-bit split phase code representing "request." The request message, "110" is shown at 701 in FIG. 7a.

With AND gate 615 enabled, the request message passes through AND gate 615 and OR gate 617 to the line driver 618. The line driver 618 drives the line 619a which is connected to the central processing unit. The request message 110 is sent to the central processor unit.

When the central processor is ready to process data, it applies a "send" message to the data line. The "send" message, 101 in split-phase code, is indicated at 702 in FIG. 7a.

4.4 Distributor Main MODEM, FIG. 6c

The data line to the central processing unit is also shown in FIG. 6c and is denoted 619b. It will be understood that this is the same line as the line 619a previously described in FIG. 6b. The split phase encoded "send" signal "101" is detected by the line receiver 620 which applies it to the split phase decoder 621. Split phase decoder 621 produces an NRZ code representing "send," "101." The three bits of this message are set into the message register 622. The three bits of this message are available as three outputs denoted NRZ, NRZ+1 and NRZ+2.

Split phase decoder 621 also produces clock pulses coinciding with each bit time of the received message. The counter 623 counts these clock pulses. When sufficient clock pulses have been counted to indicate that three bits have been received, the counter 623 produces a "message received" signal on the line 624. This "message received" signal is synchronized with the local clock. That is, upon the occurrence of the next local clock pulse, the synchronizing register 625 produces an output which triggers the one-shot multivibrator 626. The one-shot 626 produces the strobe pulse designated "Decode Enable ∧" on the line 627. The decode enable pulse on the line 627 acts through OR gate 612, to clear the timing and control counter 613 to start it retiming through another cycle.

The pulse on the line 627 also enables gating circuitry to decode the message which has been sent from the central processor unit. The decode enable pulse is applied to decoding AND gates including the AND gate 628. The other three inputs to these AND gates are combinations of the NRZ, NRZ+1 and NRZ+2 signals, and the complements of these signals, which will uniquely decode the messages from the central processor. The AND gate 628 will uniquely decode the send message "101." When such a message is present the AND gate 628 sets the send identifier register 629.

When the send identifier register 629 is set, it enables AND gate 630. The other input to AND gate 630 is an eight-bit message which identifies the distributor. The identifier message generator 631 continuously generates such an eight-bit message. When AND gate 630 is enabled, the eight-bit identification message is supplied through OR gate 617 (FIG. 6b) and through the line driver 618 to the line 619a which applies the identifier message to the central processing unit. The eight-bit identifier message is indicated at 703 in FIG. 7a.

The send identifier register 629 is reset after the identifier message has been generated. That is, the send identifier register is reset when the seventh stage of the timing and control counter is actuated thereby producing the signal $\bar{G}$. (Note that the send identifier register 629 may also be reset by the signal $\bar{K}_D$. This signal $\bar{K}_D$ is generated by the multiplex control register 609 (FIG. 6a). When register 609 is reset $\bar{K}_D$ is produced. This clears the system and allows the multiplexer to continue stepping.)

When the send identifier register 629 is reset, the one-shot multivibrator 632 generates a pulse which sets the send command register 633. The send command register 633 will remain set off 1 millisecond. That is, it is reset by the signal $\overline{C}$ from timing and control counter 613. (Or it is reset by the $\overline{K_D}$ signal.)

The output 634 of register 633 is up for 1 millisecond. This 1-millisecond signal is applied through OR gate 635 and over line 635a to enable the −9-volt command driver 643 to apply the −9-volt "send" pulse through the multiplexer 601 to the addressed data line.

The one-shot multivibrator 632 also sets the message gate register 657a. The message gate resister 657a enables the AND gate 637 so that the next message from one of the counter units will pass through AND gate 637 and thence through OR gate 617, and line driver 618 to the line 619a.

As previously described in conjunction with the counter unit, the counter unit will now apply the split phase code representing the charge account number to the data line. The charge account number, which appears on line 603, FIG. 6a, is detected by the data detector 636. The message is coupled through AND gate 637 and OR gate 617 and over line driver 618 to the line 619a. The central processor receives the credit card number and imposes one of a plurality of responses onto the line 619b (FIG. 6c). The response may be "valid," "in memory " or "invalid." Assume that the response is "invalid." This is a three-bit message "100." As previously described, the three-bit message, "100," on the line 619b is decoded into NRZ by the decoder 621, and set into the three-bit message register 622.

When AND gate 637 (FIG. 6d) decodes an "invalid" message, "100," the invalid energy register 638 is set. The output 639 of this register has an up condition thereon which acts through OR gate 635 (FIG. 6d) to enable the −9-volt command driver 643 (FIG. 6a). Invalid register 638 remains set until timing and control counter 613 counts through the stage which produces the $\overline{I}$ signal. That is, the invalid register 638 will be set for approximately 64 milliseconds. Therefore, the −9-volt command driver 643 sends a −9-volt pulse of 64 milliseconds duration over the data line to the counter unit.

When the invalid register 638 is reset, a one-shot 640 produces a pulse which passes OR gate 641 and over line 642 to clear the control register 609 (FIG. 6a). When the register 609 is cleared, the multiplexer will again start scanning data lines.

Assume now that the message recieved from central processor unit is an "in memory" signal. This three-bit message, "011,"is set into the three-bit message register 622 (FIG. 6c) as previously described. It is decoded by the AND gate 644 (FIG. 6d) which produces an output which sets the "reasons received enable" register 645. When the register 645 is set, the one-shot multivibrator 646 is triggered. The one-shot sets the "in memory" register 647. The output of this register is applied through OR gate 635 and over line 635a to the −9-volt command driver 643 (FIG. 6a). The −9-volt command driver 643 applies a −9-volt pulse to the data line to the counter unit. The −9-volt "in memory" signal will be only approximately 8 milliseconds in duration since the "in memory" register 647 is reset at the $\overline{F}$ time of the timing and control counter 13. When the "in memory" register 647 (FIG. 6d), is set, the one-shot 648 is triggered. This produces a pulse which is applied through OR gate 641 and through OR gate 612 (FIG. 6b) to clear the timing and control counter 613 and to start the timing again.

When the reasons received enable register 645 (FIG. 6d) is set, it also enables an AND gate 648a. This permits clock pulses from the split phase decoder 621 (FIG. 6c) to pass through AND gate 648a to the authorizer unit. The purpose of these clock pulses will be subsequently described.

Figure 6D:
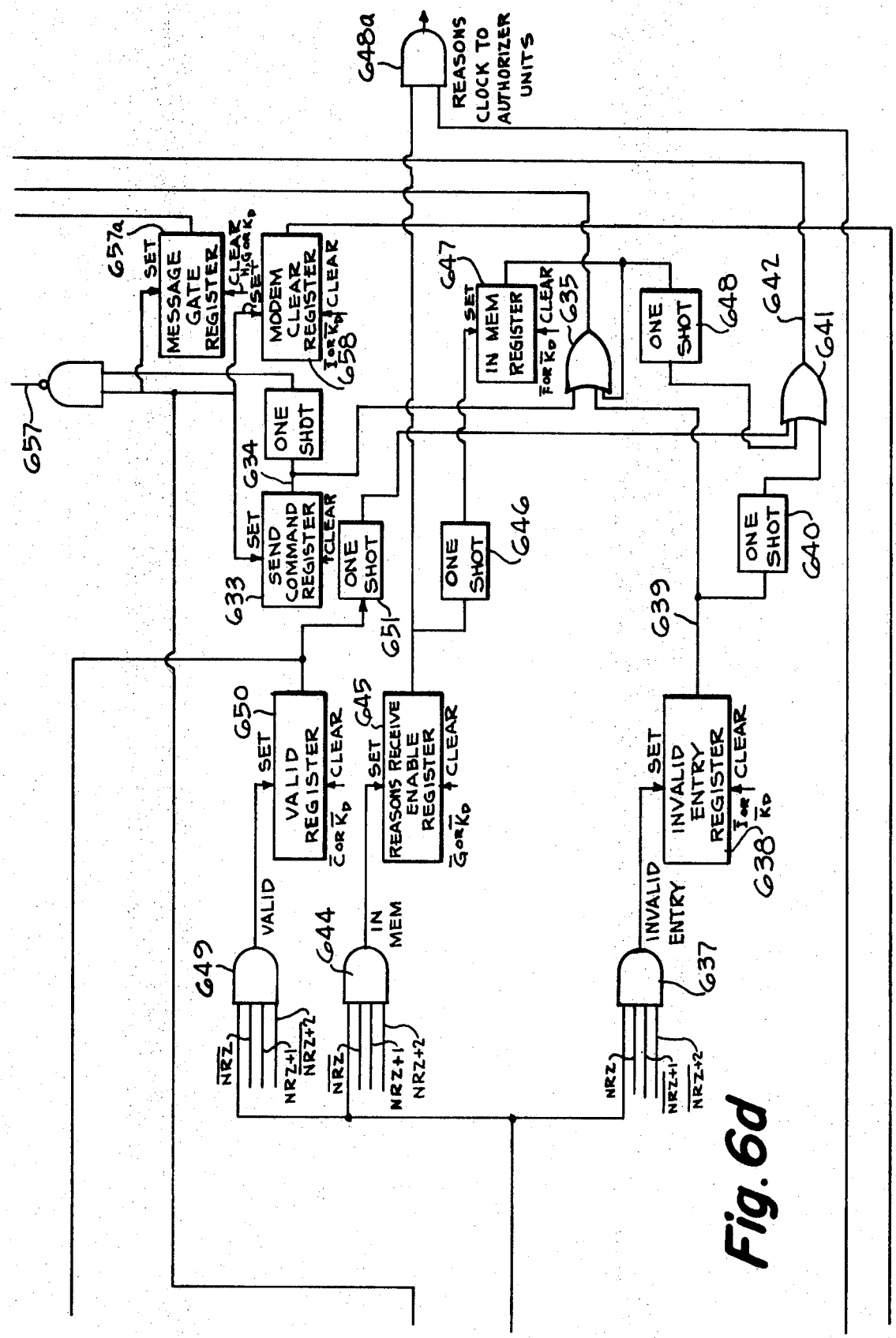

Assume now that the message received from the central processor unit is a "valid" signal, "010." Again the three-bit message is set into the message register 622 (FIG. 6c). The three bits of this message are decoded in AND gate 649 (FIG. 6d). The output of AND gate 649 sets the valid register 650. The output of this register enables the +9-volt command driver 656 (FIG. 6a) to send out a 9-volt pulse on the data line to the counter unit. The +9-volt "valid" signal is of relatively short duration since the valid register 650 is reset at the time of the pulse $\overline{C}$ or $\overline{K_D}$. When the valid register 650 is set, the one-shot multivibrator 651 is triggered. This produces a pulse which is applied through OR gate 641 and OR gate 612 (FIG. 6b) to reset the timing and control counter 613.

When the one-shot multivibrator 632 (FIG. 16) releases an output pulse the MODEM clear register 658 is set. The output of MODEM clear register 658 is applied to split phase decoder 621, three-bit message register 622, counter 623 and synchronizing register 625 to clear them.

4.5 The Interconnection of Distributor Units

In the preceding description, it was assumed that FIGS. 6a—6d were the central distributor 22 of FIG. 1. In this case, the line 619a, 619b was the connection between the central distributor 22 and the central processor 10.

However, the same distributor circuitry is present in each of the distributors 19, 20 and 21 of FIG. 1. The interconnection of the distributor to the remaining system components will now be described.

Assume now that the circuitry of FIGS. 6a—6d is the distributor 19. The counter units 13—15 are connected to the data lines 602 in FIG. 6a. The line 619a, 619b (FIG. 6b) is the line between the distributor 19 and the distributor 20. In this case, the request message generator 616 will generate a request message "110" when one of the data lines 602 is at the +1-volt level. The message "110" is placed on the line 619a which connects it to the distributor 20 (FIG. 1).

Assume now that the circuitry of FIGS. 6a—6d is the distributor 20. The message "110," which has been placed on line 619b, passes through the line receiver 620 (FIG. 6c). The message is decoded in the split phase decoder 621 which inserts into the three-bit message register 622 an NRZ code corresponding with "110." This three-bit code is decoded by the AND gate 652 (FIG. 6d) AND gate 652 enables the request level divider 653 which produces a +1-volt level on the distributor line 654 which is connected to the multiplexer 601.

After the multiplexer 601 scans all of the data lines, it will scan the distributor lines. When it reaches the line 654, it will lock onto the line 654.

As previously described, the +1-volt level on the line 654 is connected over line 603, through request level detector 607, to the one-shot 608 which sets request message enable register 614. Request message generator 616 will generate another request message "110" which is sent out over the line 619a. In this case the line 619a is connected to the next distributor, i.e., to the MODEM associated with central distributor 22. This MODEM has the same circuitry as that shown in FIG. 6a and FIG. 6c. When the message "110" 110, is received on line 619b in this MODEM, it is placed in the three-bit message register 622 as previously described. The message "110" 110, is decoded by AND gate 652 as previously described. The output of AND gate 652 enables a one-shot multivibrator 655. While this one-shot is present in all distributors, its output has a connection only for the central distributor. The output of one-shot multivibrator 655 is connected over a separate line to the central processor. The signal on this line is denoted "request $\wedge$."

The operation can be better understood with reference to FIGS. 8a—8d. FIG. 8a shows the line connecting distributor 19 with the input to distributor 20. FIG. 8b shows the line between the distributor 20 and the input to the main distributor 20. FIG. 8c shows the line between the central distributor 22 and the central processor 10, and FIG. 8d shows the waveform on the line connection distributor 19 to the counter unit requesting service. The request message 110 from distributor 19 is indicated as 801. The request message 110 from distributor 20 is indicated as 802. The request message 110 from the central distributor is indicated at 803. When the central processor receives this message, together with the "request ∧" signal, it will generate a send signal indicated at 804. This send signal is applied to distributor 22. It passes through distributor 22 and appears on the line between distributors 20 and 22 as indicated at 805 and it passes through distributor 20 and appears on the line between distributor 20 and distributor 19 as indicated at 806. The send signal is converted into a −9-volt, 1-millisecond pulse which is transmitted over the data line to the counter unit requesting service.

The counter unit requesting service generates the split phase code indicating the charge account number and this number is connected through all of the distributors to the central processor. Note that distributor 19 is the only one connected to a counter unit. Therefore, only that counter unit will generate a charge account number which is connected back through the distributor units to the central processor. The charge account number is shown at 807, 808 and 809. The reply from the central processor, indicated at 810, will be connected back through distributor 22, distributor 20 and distributor 19. Since distributor 19 is the only one connected to a counter unit, only that counter unit will respond to the signal whether it be valid or invalid entry.

5.0 The Authorizer Unit, FIGS. 9a and 9b

The authorizer unit provides a keyboard for inserting credit card numbers into memory in the central processor, for deleting numbers from the central processor file and for inquiring as to whether a number is in memory.

As shown in FIG. 9b, the authorizer unit includes a keyboard 901, a display 902 for displaying the charge account number being operated upon and a display 903 which indicates the reasons why a negative account number was placed in memory.

On the keyboard 901, the following function pushbuttons, or keys, have been indicated: Insert pushbutton 904, delete pushbutton 905, inquire pushbutton 906 and clear button 907.

A three-position key 908 is manually set by the credit manager to the function which is to be performed. The key 908 will produce an up signal on the insert line, the delete line or the inquire line depending upon the setting of the key.

In the middle of the keyboard are digit pushbuttons, or keys, which are sequentially pushed to encode a charge account number.

The BCD encoder 909 responds to the depressed pushbutton, function or digit, to produce a binary coded decimal code. The BCD codes present on line 910 are applied to the word register 911, to the function register 912 and to the reasons register 913. The BCD codes will be steered into the correct register by the following circuitry.

A digit or function recognition circuit 914 determines whether the key depressed and the code produced is a digit or is one of the functions. If it is a digit, the energy shift control register 915 is enabled. The shift control counter 915 produces shift pulses. The digit counter 916 counts the number of pulses. It will allow the BCD code appearing on line 910 to be entered into word register 911 up to its preset limit which is predetermined by the number of digits on the charge card.

If the digit or function recognition circuit 914 recognizes a function code, it will enable the function register 912 to receive the BCD code on line 910.

When the digit or function recognition circuit 914 recognizes that a function has been operated on the keyboard, the one-shot multivibrator 917 is triggered. This produces a pulse which sets the request register 935 on FIG. 9a as will be subsequently described.

The readout of the function from register 912 and the charge account number from register 911 is controlled by the send register 918. Initially, the send register 918 is in the reset state and its output line 919 is up. The output line 919 enables and AND gate 920. Therefore, as the function register 912 is counted down and the first digits reach output line 921, the digits of the function will be transmitted through AND gate 920 and through OR gate 922 into the message encoder 923 (FIG. 9a). The message encoder 923 places the function code on the data line 924 which is connected to the authorizer unit control logic 504 of FIG. 5. (Specifically, the line 924, FIG. 9a, is connected to one of the data lines 602, FIG. 6a.) Normally, the first data line on each multiplexer is connected to an authorizer unit.

The function code is connected through the distributor to the central processor unit. The central processor unit upon receiving a function code will send back a −9-volt, 1-millisecond send pulse. The send pulse is sensed by the negative level detector 925 and, after the time delay indicated at 926, the message enable register 926 will be set. This starts the message enable counter 928. The output line 929 of the message enable register is also connected to the one-shot 930 (FIG. 9b). When the message enable resister is set, the one-shot 930 produces a pulse which sets the send register 918. Then, the output line 931 of the send register goes up. This enables AND gate 932. Thereafter, the charge account number in the word register 911 passes through AND gate 932 and OR gate 922 to the message encoder 923 (FIG. 9a). Message encoder 923 places the encoded charge account number on the data line 924. The encoded charge account number is transmitted to the central processing unit. The central processing unit may respond in a number of ways.

If the number transmitted to the central processor is a valid number which is not in memory, a +9-volt pulse is sent back from the distributor unit and applied to the data line 924. The +9-volt pulse is detected by the positive level detector 933 which enables the AND gate 934. Assuming that request register 935 is set, the pulse passes through AND gate 934 and sets the valid register 936. This enables the valid display 937 which indicates to the credit manager that the charge account number is a valid one.

Assume now that the charge account number transmitted to the central processor was a number which is in memory. In this case a −9-volt pulse of approximately 8 milliseconds duration is applied to the line 924. This detected by the negative level detector 925 which sets the message enable register 927 and enables the message control counter 928 to start counting. When the counter 928 has counted through the first stage, the line 937 goes up. This enables the AND gate 938. If the output of negative level detector 925 is still up, indicating an in memory signal rather than a send pulse, then the output of AND gate 938 sets the in memory register 939. This enables the in memory display 940 which indicates that the message transmitted is in memory. The "in memory" pulse, however, terminates before the message control counter 928 enables AND gate 942. Therefore, the invalid register 943 is not set in response to an "in memory" signal.

Assume now that the change account number transmitted to the central processor is invalid. In this case there is applied to the data line 924 a −9-volt pulse of approximately 64 milliseconds duration. Again it is detected by the negative level detector and the message control counter is started counting. When the message enable counter 928 has counted through the fourth stage, the line 941 goes up. This enables AND gate 942. Assuming that the output of negative level detector 925 is up, the output of AND gate 942 sets the invalid register 943. This enables the invalid display 944 which indicates to the credit manager that the number transmitted to the central processor is an invalid one. A multiplicity of different length negative signals can also be decoded by setting a register with the appropriately decoded time from the message control counter.

The operation of the authorizer unit can be summarized as follows.

Assume first that the credit manager desires to insert a charge account number into memory in the central processor. The three-position key 908 is set to the insert position and an up condition is present on the insert line. He then sequentially pushes the buttons in the center of the keyboard to encode the charge account number. These first eight digits are loaded into the word register 911. This switches the output of digit counter 910 enabling the reasons register 913 to receive the subsequently loaded digits. Next, he pushes two more digit buttons to encode the reason why the charge account number is being inserted into memory. These next two digits are loaded into the reasons register 913. Next, he pushes the function button 904 to indicate an insert function. The function is encoded and inserted into the function register 912. This also triggers one-shot multivibrator 913 which sets the request register 935. A +1-volt level appears on data line 924.

When a send signal is applied to the line 924, the message enable register 927 is set and the message control counter 928 starts to count. The messages in the registers 911, 912 and 913 are all circulated under the control of the message control counter 928. Of the three AND gates 920, 932 and 932a only AND gate 920 is enabled because the first send register 918 is the reset condition. The line 919 is up. Therefore, the function message is transmitted through OR gate 922, is encoded by message encoder 923 and is transmitted over the data line 924 to the central processor.

The word register 911 is of a length sufficient to contain the bits required to encode the charge card, e.g., 32 bits for an eight-digit card.

The function register 912 is an eight-bit register which is recirculated through inverter 945. This creates an output function signal of the same length as the word register 911 output. The resultant function signal on line 921 then consists of the eight-bit word, first sent noninverted, then inverted, then noninverted and then inverted. This results in a unique longer word with a lower probability of detection in the event of signal corruption, intentional or unintentional.

Upon reception of a function code, the central processor sends back a send signal. This sets the first send register 918; that is, the line 931 goes up and the line 919 goes down.

The message control counter 928 is enabled to start counting and it circulates the messages in the registers 911, 912 and 913. This time, the AND gates 932 and 932a will be enabled. Therefore, the charge account number in word register 911 will be transmitted to the central processor followed by two digits from the registers 913. Note that the insert line is applied to AND gate 932 from the three-position key 908 so that this AND gate is enabled.

Assume now that the operator wishes to delete a number from the memory at the central processor. He pushes the digit keys to encode the charge account number which is loaded into word register 911. He turns the key switch 908 to the delete position and then pushes the delete button 905 to load the delete function message into the register 912. Upon reception of the first send signal from the central processor, the function is clocked out of the register 912 and transmitted over line 924. Upon reception of the next send signal, the charge account number in word register 911 is clocked out and applied to line 924.

Assume now that the credit manager desires to make an inquiry as to a charge account number. He pushes the digit buttons on keyboard 901 to encode the charge account number. He then pushes the inquire button 906. Upon reception of the first send signal, the inquiry message is transmitted to the central processor. Upon reception of the second send signal, the charge account number is sent to the central processor. In response to this, the central processor sends back to the authorizer a message indicating that the charge account number is invalid, valid or in memory. The valid display 937, the invalid display 944, or the in memory display 940 is accordingly actuated. If the response is "in memory," one further operation takes place. The reasons received data from the distributor unit is applied to the reasons register 913. The digits of this message are set into the reasons register 913 by the reasons clock pulses from the distributor unit. The credit manager now has a display of the reason why the number is in memory.

5.0 Central Processor Unit, FIG. 10

The central processor unit includes a modulator-demodulator (MODEM) 1001 which is similar to the modulator-demodulator in the distributor unit. When there is a request Λ signal from the central distributor, data recovery circuitry 1002 produces at its output the signal received from the central distributor. This signal is checked with the check digit comparator 1003 to determined whether the message sent is a valid charge account number or a function message. Check digit circuit comparator 1003 may take many forms. In the example under consideration, all charge account numbers contain digits of nine or less. The function and reasons digits are greater than nine. It will be appreciated that it is within the skill of the art to perform other checks on the received message to determine whether it is a valid charge account number.

If the message received is an invalid charge account number, or a function message, results compilation circuit 1004 enables the return message generator 1005 to generate another send signal. If the retransmitted message is involved or a function, an "invalid" message is generated by return message generator 1005.

The received message is also set into the storage recirculation register 1006. The message set into this register is continuously recirculated so that the message continuously appears at the output of storage recirculation register 1006. The recirculation is performed under control of clock pulses derived from the clock track 1007 of the magnetic drum storage unit 1008.

Read-write circuitry 1009 is normally in the condition to read charge account numbers sequentially read from the main section of the storage unit 1008. All of the charge account numbers contained in memory are sequentially read and applied to the memory check comparator 1010. The numbers from memory are compared with the output of storage recirculation register 1006. If the memory check comparator determines that the message in storage recirculation register 1006 is a number in memory, the results compilation circuit 1004 is set to an "in memory" condition. This enables the return message generator 1005 to generate an in memory signal which is applied to the central MODEM 1001.

The message recirculating in the storage recirculation register 1006 is also compared with function codes stored on the function track 1011 of the storage unit 1008. The delete, insert and inquire messages are stored on the track 1001. The messages reproduced from the function track 1011 are applied to the delete comparator 1012, the insert comparator 1013 and the inquire comparator 1014. Assume that the message recirculating in the storage recirculation register is a delete function. It will match the delete function message stored on track 1011 and the delete comparator 1012 will set delete register 1015. (Note that it is very unlikely that noise or a missent message will set the delete register 1015 since the message, as explained previously, is repeated four times, twice inverted and twice normally and only a match between all four repetitions will set the delete register 1015. The possibility of detecting a function in error is minimized.)

Similarly, if the message recirculating in the insert register 1016 is an insert message, the insert comparator will set the insert register 1016.

The outputs of delete register 1015 and insert register 1016 are OR'd in the OR gate 1017. The output of OR gate 1017 switches read-write circuitry 1019 to the write condition. This output also enables memory, timing and control circuitry 1018 to look up the address of the next message, which is the charge account number to be transmitted following the function code. Memory, timing and control 1018 is responsive to the address bits stored on the address track 1019 of the storage unit. The address for storage is the last three bits of the charge account number. Therefore, memory, timing and control 1018 can look up or address any of the storage locations in the main section of the storage unit 1018.

Assuming that delete register 1015 has been set, the write zeros circuitry 1020 will insert zeros into the location in the main section corresponding with the address of the charge account number recirculating in storage recirculation register 1006.

Assume now that the function message recirculating in storage recirculation register 1006 is the insert function. The insert register 1016 will be set. The read-write circuit 1009 will be set to the write condition. The memory, timing and control 1018 will position the magnetic drum to write in the storage location having an address corresponding to the next charge account number received and inserted in storage recirculation register 1016. The write message generator 1021 is enabled to apply this charge account number to the read-write circuit 1009 which inserts this charge account number into the proper memory location in the storage unit 1008.

Assume now that the function message recirculating in storage recirculation register 1006 is an inquire message. The inquire comparator 1014 enables memory, timing and control to look up the next charge account number received. If the number is contained in memory, the number together with the two reasons digits are read by the read-write circuitry 1009. Memory check comparator 1010 enables results compilation circuitry 1014 to generate, through return message generator 1005, an in memory signal. The reasons message is separately clocked out to the distributor unit.

While a particular embodiment of the invention has been shown and described, it will, of course, be understood that various modifications may be made without departing from the true spirit and scope of the invention. The appended claims are, therefore, intended to cover any such embodiments.

We claim:

1. A system for verification of customers' credit status in response to entry of an account number at remote locations comprising:
   a central processor unit having a storage means for storing signals representing account numbers,
   a plurality of counter units at said remote locations each having means for encoding the account number as an electrical signal on a single two-wire line,
   a plurality of distributor units, each of said counter units being connected through a single two-wire line to the input to certain of said distributor units, some of said distributor units being connected over transmission lines to other distributor units, at least one of said distributor units being connected over a transmission line to said central processor unit, each of said distributor units having:
   multiplexing means for scanning the single two-wire lines from units connected to the input of said distributor unit and for servicing one of the units, and
   means for applying the encoded account number over transmission lines to said central processing unit, comparing means in said central processor unit for comparing the data received from said distributor units with signals stored in said storage means, and
   means in said distributor units responsive to said comparing means for transmitting a signal over said two-wire line of the counter unit being serviced indicating that credit is to be extended on an account number entered in said counter unit only when said comparing means determines that the number has a positive credit status.

2. The system recited in claim 1 wherein each of said counter units further includes:
   means for applying to said single two-wire line a voltage indicating a request for service upon entry of an account number and wherein said multiplexing means services a counter unit in response to the presence of said voltage at said input of said distributor unit.

3. The system recited in claim 1 wherein each of said counter units includes:
   an input device for converting a credit card number into an electrical code,
   a message control counter producing sequential outputs in response to the receipt of a send signal on the two-wire line connecting said counter unit to a distributor, and
   a message encoder for converting said electrical code into a serial-by-bit message in response to the outputs of said message control counter, said serial-by-bit message being applied to said two-wire line connecting said counter units to a distributor unit.

4. The system recited in claim 3 wherein said input device is a credit card reader.

5. The system recited in claim 3 wherein said input device is a manually operated keyboard.

6. The system recited in claim 3 wherein said input device is a storage register with input data entry means.

7. The system recited in claim 3 wherein said central processor unit stores signals representing account numbers of customers whose credit is not to be honored and wherein there is transmitted to said counter unit a pulse of a first polarity when the account number transmitted to the central processor is valid and is not in memory, said counter unit further comprising:
   a valid register which is set in response to said pulse of a first polarity, and
   emboss operation circuitry operating when said valid register is set to indicate that said account number is to be extended credit.

8. The system recited in claim 7 wherein said send signal is a pulse of the opposite polarity, said message control counter being stated in response to said pulse of the opposite polarity.

9. The system recited in claim 8 wherein a pulse of opposite polarity and of longer time duration than said send signal is transmitted to said counter unit when the account number transmitted to the central processor unit is an invalid number or is in memory, said counter unit further comprising:
   an invalid register,
   means for setting said invalid register when a pulse of opposite polarity is transmitted to said counter unit and when said message control counter has counted through at least one stage, and
   eject operation circuitry operating when said invalid register is set to indicate that said account number is not to be extended credit.

10. The system recited in claim 8 wherein a pulse of said opposite polarity and of longer time duration than said send signal is transmitted to said counter unit when the account number transitted to the central processor unit is an invalid number or is in memory, said counter unit further comprising:
    a plurality of registers,
    means for setting one of said registers when a pulse of opposite polarity is transmitted to said counter unit and when said message control counter has counted through to the appropriate stage thereby measuring the effective pulse length of said pulse of opposite polarity, and
    indicating circuitry operating when said one register is set to indicate the reason associated with the particular time length of said pulse of opposite polarity.

11. The system recited in claim 1 wherein said counter unit further includes:
    a request switch actuated when said counter unit requests service,
    a request register set in response to actuation of said request switch, said request register applying a voltage indicating a request for service to said two-wire line,
    said multiplexing means in the distributor to which said counter unit is connected being responsive to said voltage to connect said counter unit to the output of said distributor.

12. The system recited in claim 1 wherein said distributor unit includes:
    a request enable register,
    means responsive to a voltage indicating a request for service on said single two-wire line for setting said request enable register, and a request message generator which applies a serial-by-bit "request" message to the line connecting said distributor to the central processor when said request enable register is set.

13. The system recited in claim 1 wherein the central processor unit transmits a serial-by-bit "send" message when it is available to service a request by one of said counter units and wherein each of said distributor units includes:
   a decoder connected to the line to the central processor unit, said decoder including means for decoding the send message received from the central processor, and
   means responsive to said decoder for applying a send pulse to the line connecting said distributor to the counter unit requesting service when a send message is received.

14. The system recited in claim 13 further including:
   a send identifier register which is set when said decoder responds to a send signal received from said central processor, and
   an identifier message generator which generates a serial-by-bit message identifying the distributor unit, said serial-by-bit identifier message being applied to the line to the central processor when said identifier register is set.

15. The system recited in claim 1 wherein said central processor responds to the transmission of the account number to it by applying a serial-by-bit "valid" or "in memory" message to the line to the distributor to which the counter unit requesting service is connected, each of said distributor units further comprising:
   a decoder responsive to receipt of said "valid" and "in memory" messages from said central processor,
   means responsive to said decoder for applying a valid pulse of a first polarity to the line to the counter unit requesting service, and
   means responsive to said decoder for applying an "in memory" pulse of the opposite polarity to said line connecting said distributor unit to the counter unit requesting service.

16. The system recited in claim 15 wherein said central processor responds to a request for service by transmitting a serial-by-bit "send" message to the distributor to which the counter unit requesting service is connected and wherein each distributor unit further includes:
   means responsive to said decoder for producing a send pulse of said opposite polarity, said means for applying an "in memory" pulse producing a pulse of longer duration than said send pulse so that said counter units can discriminate said send pulse from said in memory signal by the difference in time duration between the two pulses.

17. The system recited in claim 13 wherein said decoder produces clock pulses coinciding with both the beginning and end of each bit time of the received message, and
   counter for counting said clock pulses to produce a "message received" signal when a complete message has been received from said central processor.

18. The system recited in claim 1 further including:
   an authorizer unit connected to the input of one of said distributors, said authorizer unit having:
   means for entry of new account numbers into said storage means, and
   means for inquiring as to the presence or absence of an account number in said storage means, and the reason for the credit status of the account number.

19. The system recited in claim 18 wherein said authorizer unit comprises:
   a keyboard having digit encoding keys and function encoding buttons including an insert button, a delete button and an inquire button, and
   means responsive to depression of any of said keys or buttons for producing a binary code representing the digit or function being encoded.

20. The system recited in claim 19 further comprising:
   a word register,
   a function register,
   gating means for steering binary coded digits into said word register and for steering binary coded functions into said function register,
   means for applying the contents of said word register serially-by-bit onto the line connecting said authorizer unit to a distributor unit in response to the receipt of one send signal, and
   means for applying the contents of said function register serially-by-bit onto the line connecting said authorizer unit upon receipt of another send signal.

21. The system recited in claim 20 further comprising:
   a reasons register, said gating means steering a selected number of digits representing an account number into said word register, said gating means steering the next selected number of binary coded digits into said reasons register, and
   means for applying the contents of said reasons register serially-by-bit onto the line connecting said authorizer unit to a distributor unit after the transmission of the contents of said word register.

22. A system for verification of customers' credit status in response to entry of an account number at remote locations comprising:
   a plurality of counter units at said remote locations each having means for encoding the account number to be verified,
   a central processor unit having storage means for storing signals representing the credit status of account numbers of customers, and
   comparing means for comparing account numbers received from said counter units with signals stored in said storage means, said central processor unit transmitting to said counter unit a pulse of a first polarity when the account number transmitted to the central processor has a positive credit status, each of said counter units further comprising:
   a valid register which is set in response to a pulse of said first polarity, and
   circuitry operated when said valid register is set to indicate that said account number is to be extended credit.

23. The system recited in claim 22 wherein said central processor transmits a pulse of opposite polarity to said counter unit when the account number is an invalid number or has a negative credit status, said counter unit further comprising:
   an invalid register,
   means for setting said invalid register when a pulse of opposite polarity is transmitted to said counter unit, and
   circuitry operating when said invalid register is set to indicate that said account number is not to be extended credit.

24. The system recited in claim 23 wherein said counter units receive a send pulse when said central processor is ready to service it, said send pulse being shorter in time duration than other received pulses of the same polarity, each of said counter units further comprising:
   a message control counter producing sequential outputs on response to the receipt of said send signal,
   gating means responsive to said sequential outputs for setting said valid register or said invalid register only in response to the receipt of a pulse of longer duration.

25. A system for verification of customer credit status in response to entry of an account number at remote locations comprising:
   a central processor unit having storage means for storing signals representing the credit status of account numbers of customers,
   a plurality of counter units at said remote locations each having means for encoding the account number to be verified, and
   an authorizer unit for entry of and deletion of account numbers in said storage means and for inquiring as to the presence or absence of an account number in said storage means including:

a keyboard having digit encoding keys and function encoding buttons including an insert button, a delete button and an inquire button and means responsive to depression of any of said keys or buttons for producing a binary code representing the digit or function being encoded.

26. The system recited in claim 25 further comprising:
a word register,
a function register,
gating means for steering binary coded digits into said word register and for steering binary coded functions in to said function register,
means for applying the contents of said word register serially-by-bit onto the line connecting said authorizer unit to a distributor unit in response to the receipt of one send signal, and
means for applying the contents of said function register serially-by-bit onto the line connecting said authorizer unit upon receipt of another send signal.

27. The system recited in claim 26 further comprising:
a reasons register, said gating means steering a selected number of digits representing an account number to said word register, said gating means steering the the next selected number of binary coded digits into said reasons register, and
means for applying the contents of said reasons register serially-by-bit onto the line connecting said authorizer unit to a distributor unit after the transmission of the contents of said word register.

28. The system recited in claim 27 wherein said distributor unit further comprises:
decoding means for decoding the recovered reasons data from said central processor unit, the output of said decoding means being connected to said reasons register in said authorizer unit so that said reasons are set into said register, and
a display actuated by said reasons register for displaying the reason that a credit card number inquired against has a negative credit status.